(12) United States Patent
Reaves et al.

(10) Patent No.: US 10,710,478 B2
(45) Date of Patent: Jul. 14, 2020

(54) METHOD AND APPARATUS FOR A ROTATABLE CHILD SAFETY SEAT

(71) Applicant: GRACO CHILDREN'S PRODUCTS, INC., Atlanta, GA (US)

(72) Inventors: Nicholas Henry Reaves, Marietta, GA (US); Taylor Daniel Genoway, Atlanta, GA (US); Thomas Jake Mitchell, Atlanta, GA (US)

(73) Assignee: GRACO CHILDREN'S PRODUCTS, INC., Atlanta, GA (US)

( * ) Notice: Subject to any disclaimer, the term of this patent is extended or adjusted under 35 U.S.C. 154(b) by 0 days.

(21) Appl. No.: 16/186,017

(22) Filed: Nov. 9, 2018

(65) Prior Publication Data
US 2019/0077282 A1    Mar. 14, 2019

Related U.S. Application Data

(63) Continuation-in-part of application No. 15/876,942, filed on Jan. 22, 2018.
(Continued)

(51) Int. Cl.
*B60N 2/28* (2006.01)

(52) U.S. Cl.
CPC ......... *B60N 2/2869* (2013.01); *B60N 2/2806* (2013.01); *B60N 2/286* (2013.01);
(Continued)

(58) Field of Classification Search
CPC ................ B60N 2/2869; B60N 2/2863; B60N 2002/2818; B60N 2/2806; B60N 2/2875;
(Continued)

(56) References Cited

U.S. PATENT DOCUMENTS 5,121,965 A * 6/1992 Skold ..................... B60N 2/286
297/256.1
5,524,964 A * 6/1996 Weimersheimer ....... B60N 2/14
297/256.1
(Continued)

FOREIGN PATENT DOCUMENTS

AU    2003227330 B2    1/2009
AU    2003227341 B2    9/2009
(Continued)

*Primary Examiner* — Milton Nelson, Jr.
(74) *Attorney, Agent, or Firm* — Eversheds Sutherland (US) LLP

(57) ABSTRACT

A rotatable child safety seat can include a seat base configured to rest on a vehicle seat and a seat shell for receiving a child therein. The seat shell can rotate with respect to the seat base and with a rotation axis offset from a center of the longitudinal axis of the seat base. The seat base can include a seat belt lock-off system for maintaining positioning of the automobile seat belt with respect to the seat base and for adding tension into the automobile seat belt. The child safety seat can include two separate seat belt/LATCH belt pathways. One seat belt/LATCH belt pathway can be provided along the seat back of the seat shell and used when the child safety seat is in a forward-facing configuration and the other seat belt/LATCH belt pathway can be provided in the seat base and used when in a rearward-facing configuration.

19 Claims, 19 Drawing Sheets

Related U.S. Application Data

(60) Provisional application No. 62/449,319, filed on Jan. 23, 2017.

(52) U.S. Cl.
CPC ......... B60N 2/2863 (2013.01); B60N 2/2875 (2013.01); *B60N 2002/2815* (2013.01); *B60N 2002/2818* (2013.01)

(58) Field of Classification Search
CPC ............ B60N 2/286; B60N 2002/2815; B60N 2/2821
USPC .......................... 297/256.12, 256.16, 236.13
See application file for complete search history.

(56) References Cited

U.S. PATENT DOCUMENTS

| | | | |
|---|---|---|---|
| 6,000,753 A * | 12/1999 | Cone, II | B60N 2/2806 297/253 |
| 6,347,832 B2 | 2/2002 | Mori | |
| 6,431,647 B2 | 8/2002 | Yamazaki | |
| 6,543,846 B2 | 4/2003 | Cone | |
| 6,554,358 B2 | 4/2003 | Kain | |
| 6,863,345 B2 | 3/2005 | Kain | |
| 7,029,068 B2 | 4/2006 | Yoshida et al. | |
| 7,086,695 B2 | 8/2006 | Hosoya | |
| 7,090,294 B2 * | 8/2006 | Balensiefer, II | B60N 2/2806 297/256.13 |
| 7,163,265 B2 | 1/2007 | Adachi | |
| 7,338,122 B2 | 3/2008 | Hei et al. | |
| D594,678 S | 6/2009 | Loew et al. | |
| 7,559,606 B2 | 7/2009 | Hei et al. | |
| 7,712,830 B2 | 5/2010 | Lhomme et al. | |
| 7,735,921 B2 | 6/2010 | Hutchinson et al. | |
| 7,770,970 B2 | 8/2010 | Hei et al. | |
| 7,901,003 B2 | 3/2011 | Meeker et al. | |
| 7,984,947 B2 | 7/2011 | Pos | |
| 8,235,465 B2 | 8/2012 | Hei et al. | |
| 8,419,129 B2 | 4/2013 | Inoue et al. | |
| 8,430,452 B2 | 4/2013 | Brunick et al. | |
| 8,459,739 B2 | 6/2013 | Tamanouchi et al. | |
| 8,511,749 B2 | 8/2013 | Hei et al. | |
| 8,596,718 B2 | 12/2013 | Gaudreau, Jr. et al. | |
| 8,651,572 B2 | 2/2014 | Medeiros et al. | |
| 8,714,644 B2 | 5/2014 | Biaud | |
| 9,010,857 B2 | 4/2015 | Chen | |
| 9,022,470 B2 | 5/2015 | Fujita et al. | |
| 9,126,509 B2 | 9/2015 | Biaud et al. | |
| 9,150,126 B1 | 10/2015 | Kitchens et al. | |
| 9,327,619 B2 | 5/2016 | Taylor et al. | |
| 9,365,135 B2 | 6/2016 | Carpenter | |
| 9,415,706 B2 | 8/2016 | Rabeony | |
| 9,499,074 B2 | 11/2016 | Strong et al. | |
| 9,527,411 B2 | 12/2016 | Szakelyhidi et al. | |
| 9,592,751 B2 | 3/2017 | Kirstein | |
| 9,840,169 B2 | 12/2017 | Mason et al. | |
| 9,937,823 B2 | 4/2018 | Williams et al. | |
| 9,969,304 B2 | 5/2018 | Johnson et al. | |
| 10,081,273 B2 | 9/2018 | Johnson et al. | |
| 10,322,651 B2 | 6/2019 | Hutchinson et al. | |
| 2011/0254331 A1 * | 10/2011 | Nagelski | B60N 2/2806 297/216.11 |
| 2019/0077282 A1 | 3/2019 | Reaves et al. | |

FOREIGN PATENT DOCUMENTS

| | | |
|---|---|---|
| CN | 201124777 Y | 10/2008 |
| CN | 100448714 C | 1/2009 |
| CN | 201833905 U | 5/2011 |
| CN | 102015364 B | 3/2013 |
| CN | 204547845 U | 8/2015 |
| CN | 106740306 A | 5/2017 |
| CN | 104859496 B | 10/2017 |
| CN | 207790408 U | 8/2018 |
| CN | 207790409 U | 8/2018 |
| EP | 1403131 A3 | 6/2005 |
| EP | 1638803 B1 | 12/2006 |
| EP | 2371621 B2 | 6/2017 |
| GB | 2562830 B | 5/2019 |
| JP | 3117917 B2 | 12/2000 |
| JP | 4073233 B2 | 2/2008 |
| JP | 4294177 B2 | 7/2009 |
| JP | 3186995 U | 10/2013 |
| JP | 2015-040034 A | 3/2015 |
| JP | 5840502 B2 | 1/2016 |
| JP | 6600716 B2 | 10/2019 |
| KR | 101642010 B1 | 7/2016 |
| TW | I377138 B | 11/2012 |
| WO | 2015/025554 A1 | 2/2015 |

* cited by examiner

METHOD AND APPARATUS FOR A ROTATABLE CHILD SAFETY SEAT

RELATED APPLICATIONS

This application is a continuation-in-part of and claims priority under 35 U.S.C. § 120 to U.S. patent application Ser. No. 15/876,942, filed on Jan. 22, 2018, and titled "Method and Apparatus for a Rotatable Child Safety Seat," which claims priority under 35 U.S.C. § 119 to U.S. Provisional Patent Application No. 62/449,319 filed Jan. 23, 2017, and titled "Rotatable Child Car Seat," the entire contents of each of which are hereby incorporated herein by reference for all purposes.

TECHNICAL FIELD

Embodiments disclosed herein are generally related to child and infant car seats and more particularly to apparatuses and methods for a child/infant car seat that is rotatable when installed in an automobile.

BACKGROUND

Various automobile child safety seats have been developed to increase the safety of an infant or child (referred to generically as "child" hereinafter) as they ride in an automobile. These automobile child car safety seats are designed to be placed on the seat of the automobile. The conventional child car seats can be coupled to one of the automobile's passenger seat belt systems or via a LATCH (Lower Anchors and Tethers for Children) system to hold the child car seat in place along the top surface of the automobile seat. In addition, the child car seat can include its own harness restraint system (e.g., a 2-point, 3-point, 4-point, or 5-point harness). Many features have been provided to improve the ergonomic aspects of using these child car seats. One ergonomic feature of conventional child car seats is to make a way for it to by making the car seat rotatable with respect to its seat base.

However, to provide a seat that is fully rotatable has generally required an overly large seat base in order to provide sufficient protection to the child passenger when the car seat is positioned in both the forward-facing and rearward-facing configuration. This results in a heavy and unwieldy car seat that can be difficult to move when desired by the user. Further, conventional car rotating car seats have provided the attachment points for the automobile seat belt or tether for the LATCH system at the seat base of the car seat in order to not affect the rotational capability of the car seat. This single point of connection to the seat base for the automobile seat belt system or tether of the LATCH system, even when the seat is in a front-facing configuration, results in a lower harness weight rating, which means only smaller infants and toddlers can be safely placed within the conventional rotating seats.

BRIEF DESCRIPTION OF THE SEVERAL VIEWS OF THE DRAWINGS

For a more complete understanding of the present disclosure and certain features thereof, reference is now made to the following description, in conjunction with the accompanying figures briefly described as follows.

DETAILED DESCRIPTION OF THE EXEMPLARY EMBODIMENTS

Example embodiments of the disclosure now will be described more fully hereinafter with reference to the accompanying drawings, in which exemplary embodiments are shown. The concepts discussed herein may, however, be embodied in many different forms and should not be construed as limited to the example embodiments set forth herein; rather, these embodiments are provided so that this disclosure will be thorough and complete, and will fully convey the scope to those of ordinary skill in the art. Like numbers refer to like, but not necessarily the same or identical, elements throughout.

Certain dimensions and features of the novel rotatable automobile child car safety seat are described herein using the term "approximately." As used herein, the term "approximately" indicates that each of the described dimensions is not a strict boundary or parameter and does not exclude functionally similar variations therefrom. Unless context or the description indicates otherwise, the use of the term "approximately" in connection with a numerical parameter indicates that the numerical parameter includes variations that, using mathematical and industrial principles accepted in the art (e.g., rounding, measurement or other systematic errors, manufacturing tolerances, etc.), would not vary the least significant digit.

In addition, certain relationships between dimensions of the rotatable automobile child car safety seat described herein and between features of the rotatable automobile child car safety seat are described herein using the term "substantially." As used herein, the terms "substantially" and "substantially equal" indicates that the equal relationship is not a strict relationship and does not exclude functionally similar variations therefrom. Unless context or the description indicates otherwise, the use of the term "substantially" or "substantially equal" in connection with two or more described dimensions or positions indicates that the equal relationship between the dimensions or positions includes variations that, using mathematical and industrial principles accepted in the art (e.g., rounding, measurement or other systematic errors, manufacturing tolerances, etc.), would not vary the least significant digit of the dimensions. As used herein, the term "substantially constant" indicates that the constant relationship is not a strict relationship and does not exclude functionally similar variations therefrom. As used herein, the term "substantially parallel" indicates that the parallel relationship is not a strict relationship and does not exclude functionally similar variations therefrom.

Figure 1A:
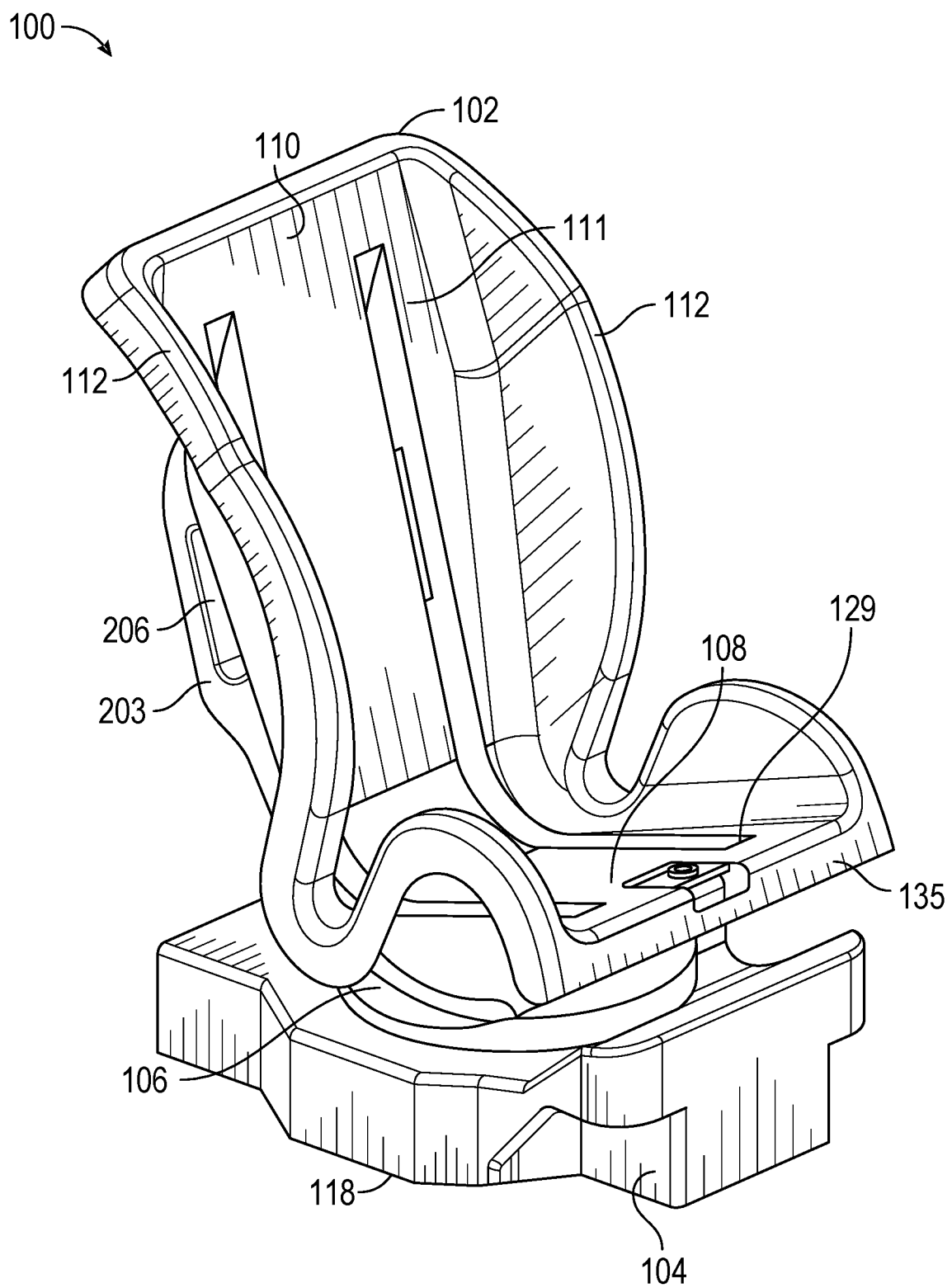
FIGS. 1A-F illustrate various views of a rotatable child car seat in accordance with one example embodiment of the disclosure.
Figure 1B:
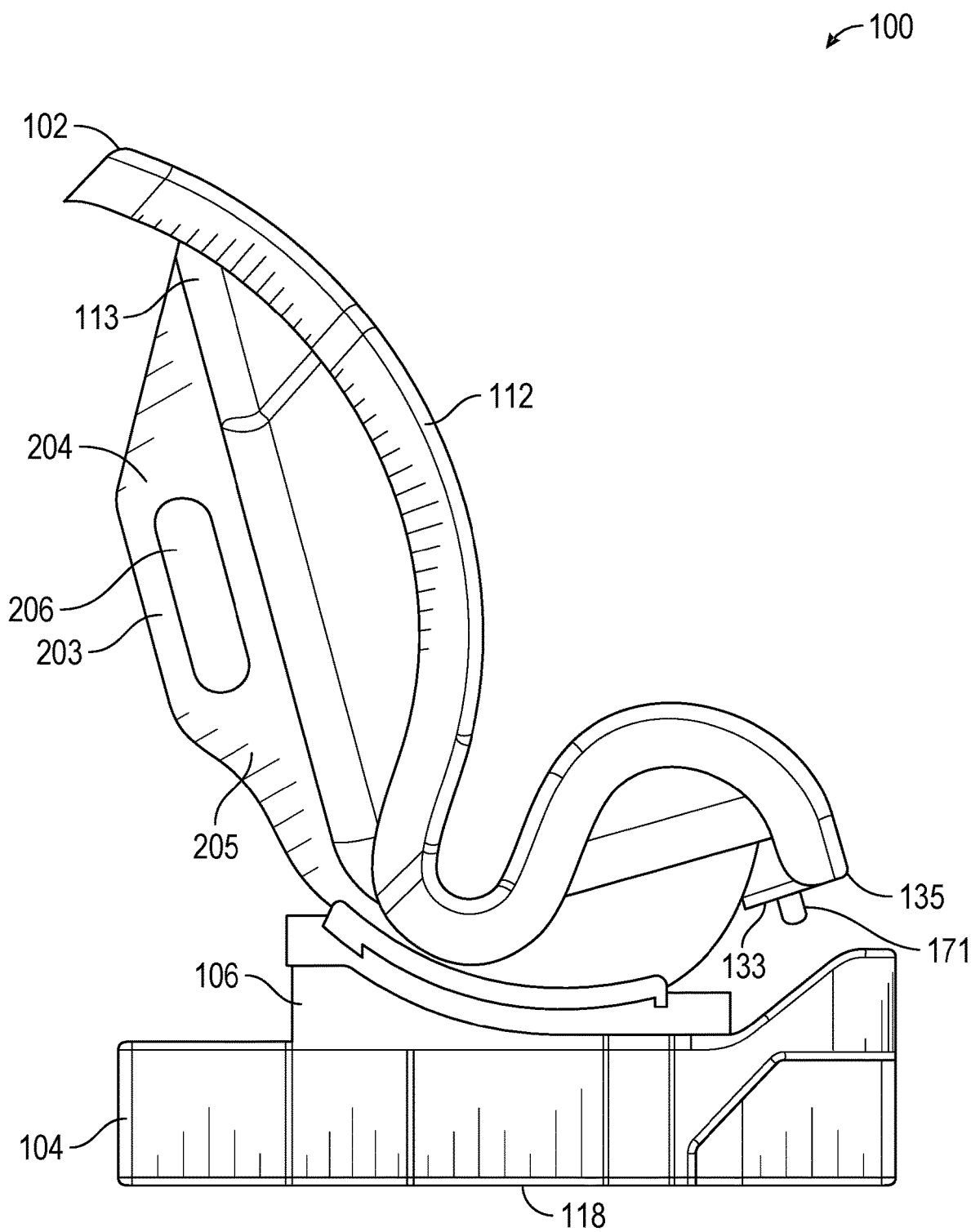
Figure 1C:
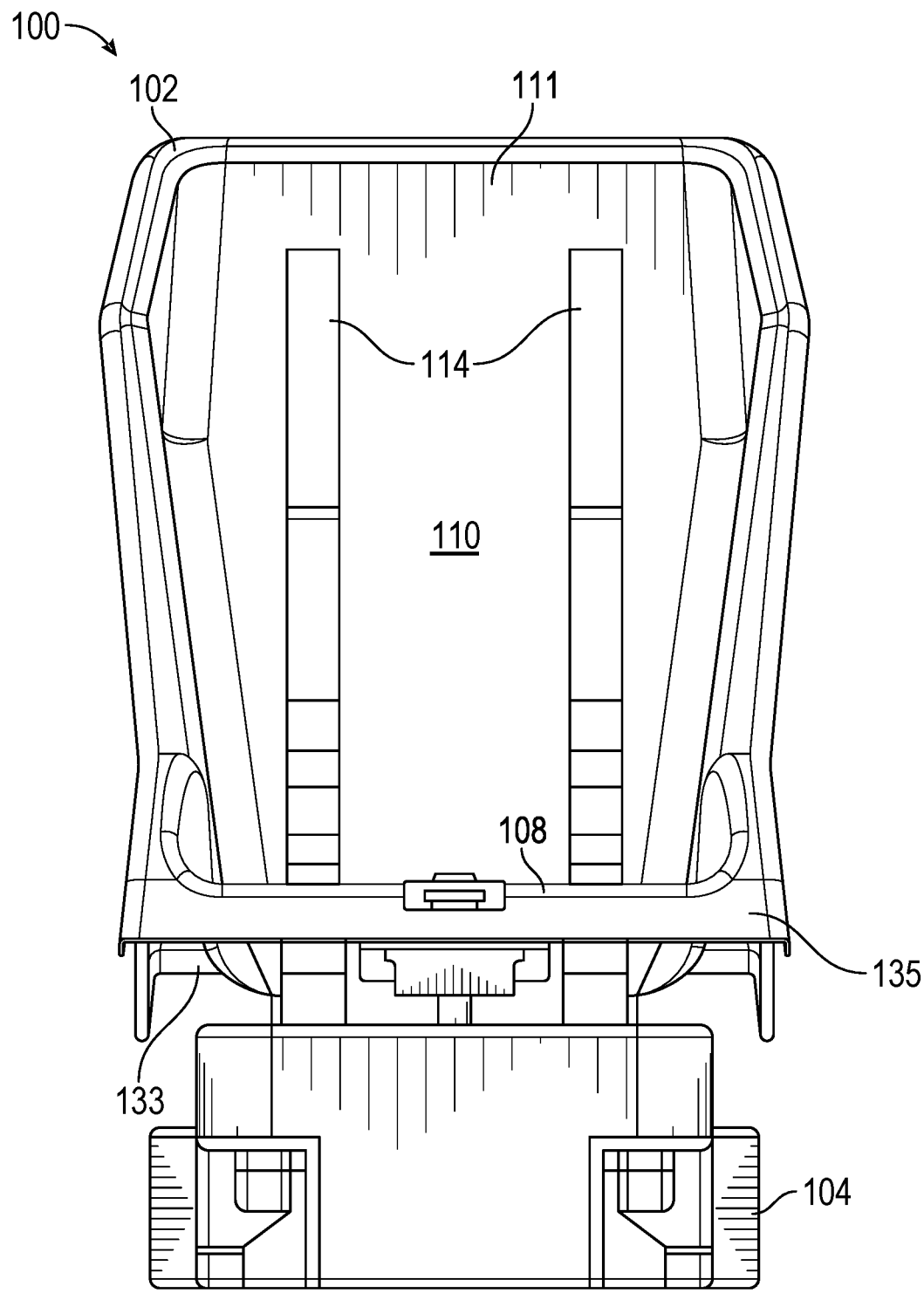
Figure 1D:
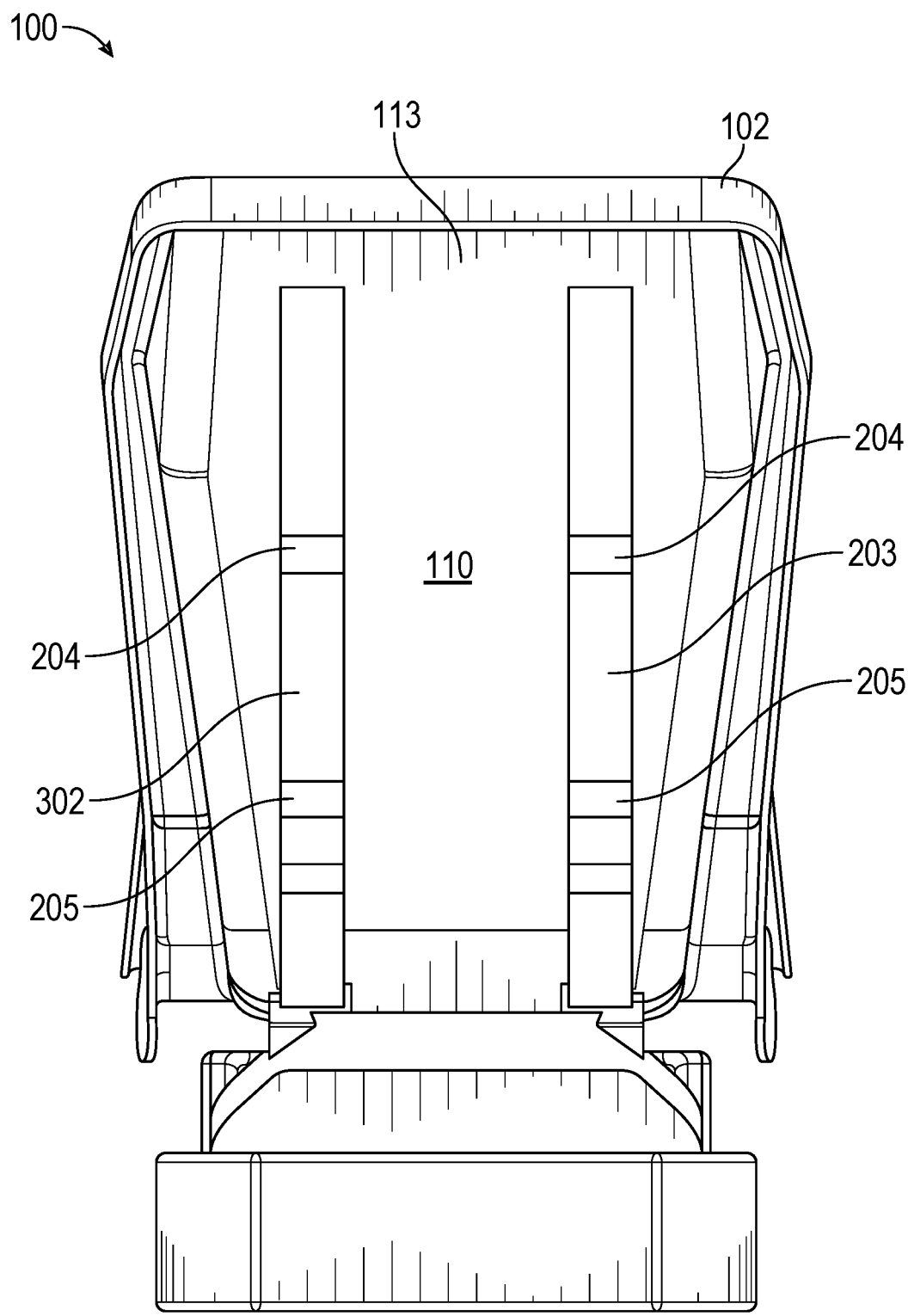
Figure 1E:
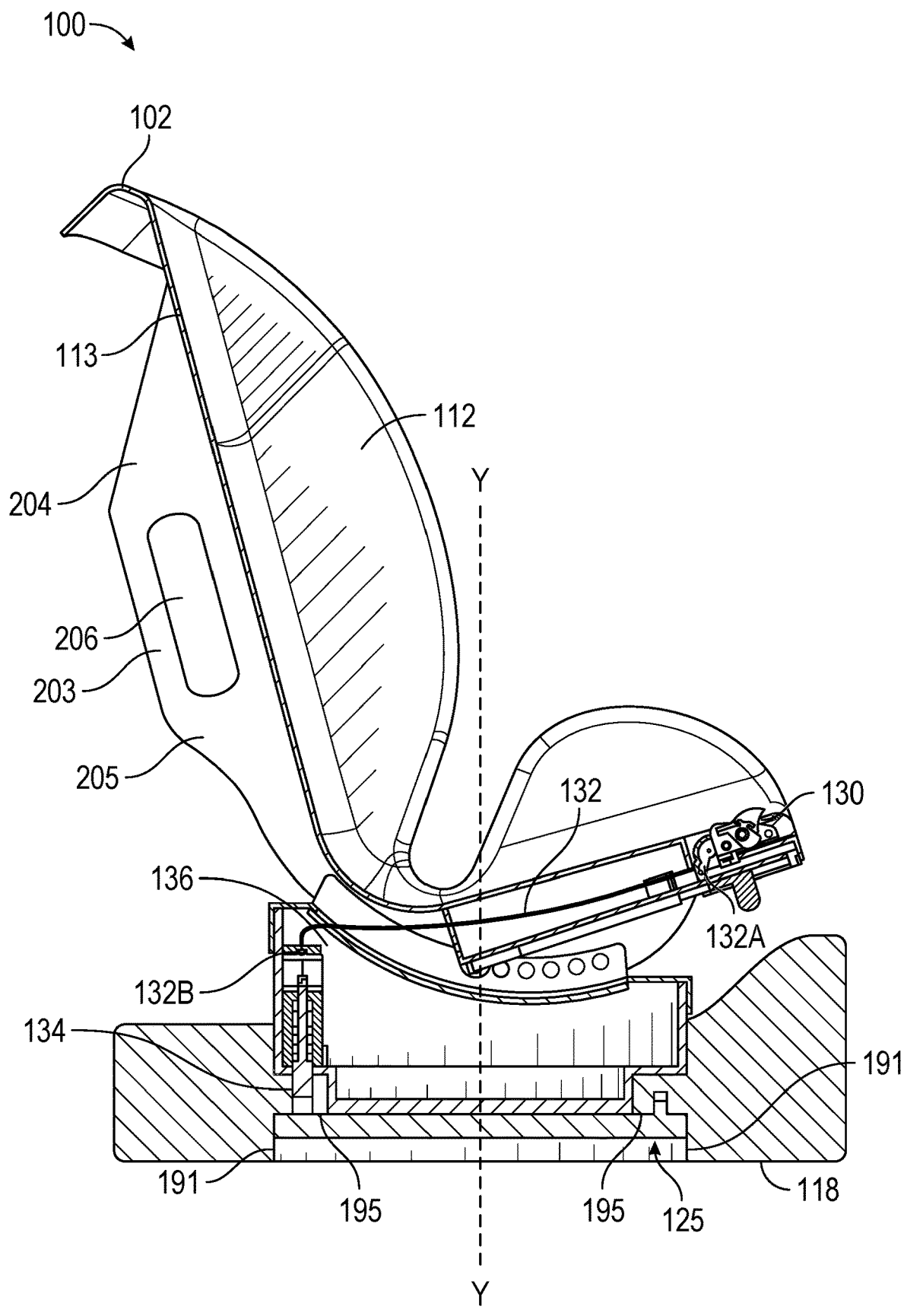
Figure 1F:
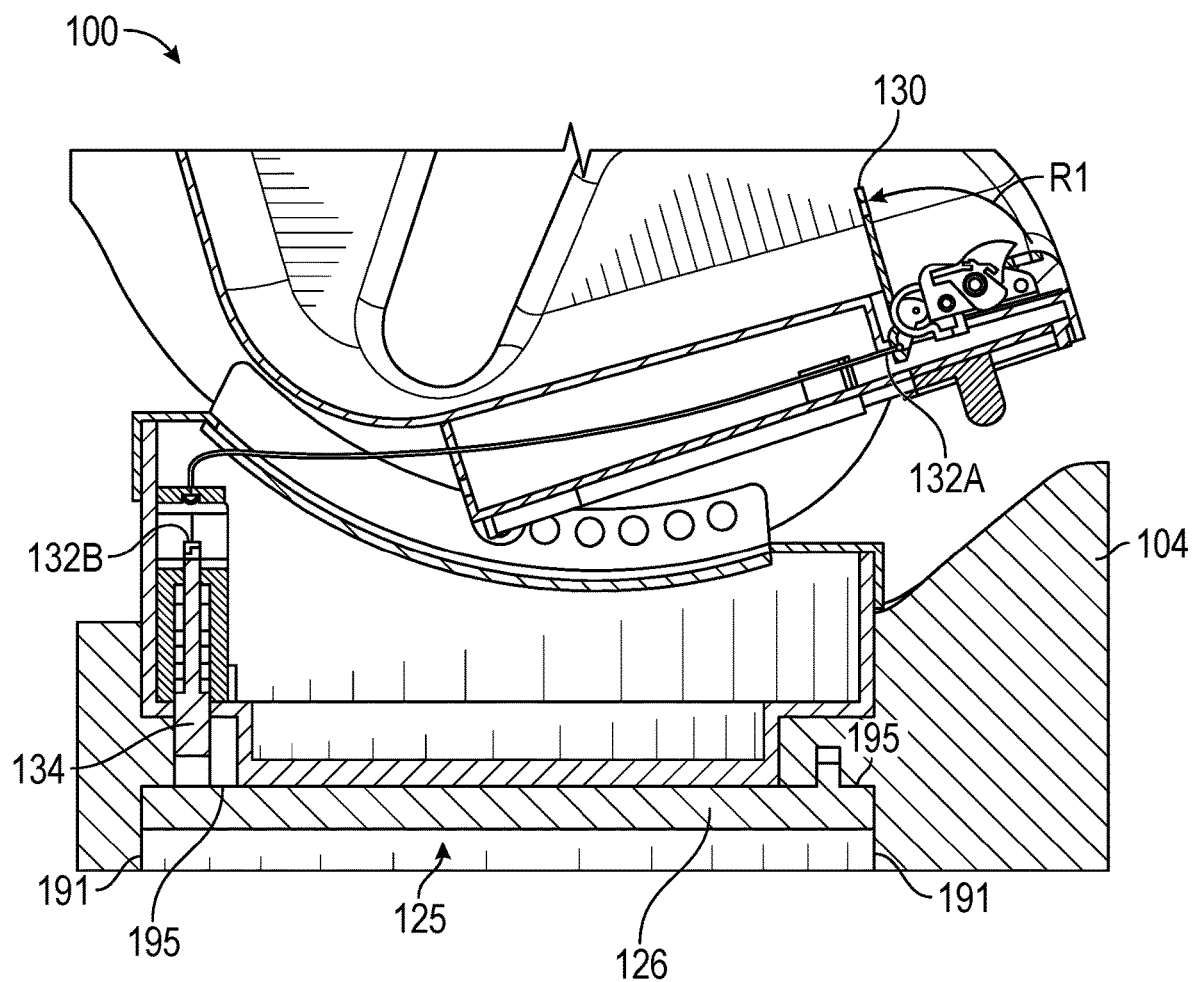
Figure 2A:
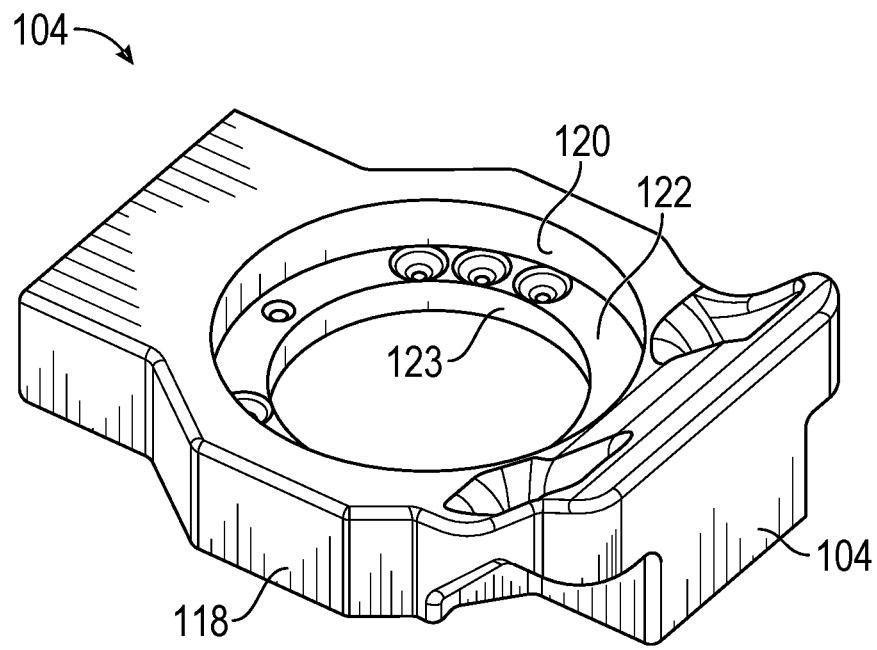
FIGS. 2A-B illustrate perspective and top plan views of a seat base for the rotatable child car seat of FIGS. 1A-F in accordance with one example embodiment of the disclosure.
Figure 2B:
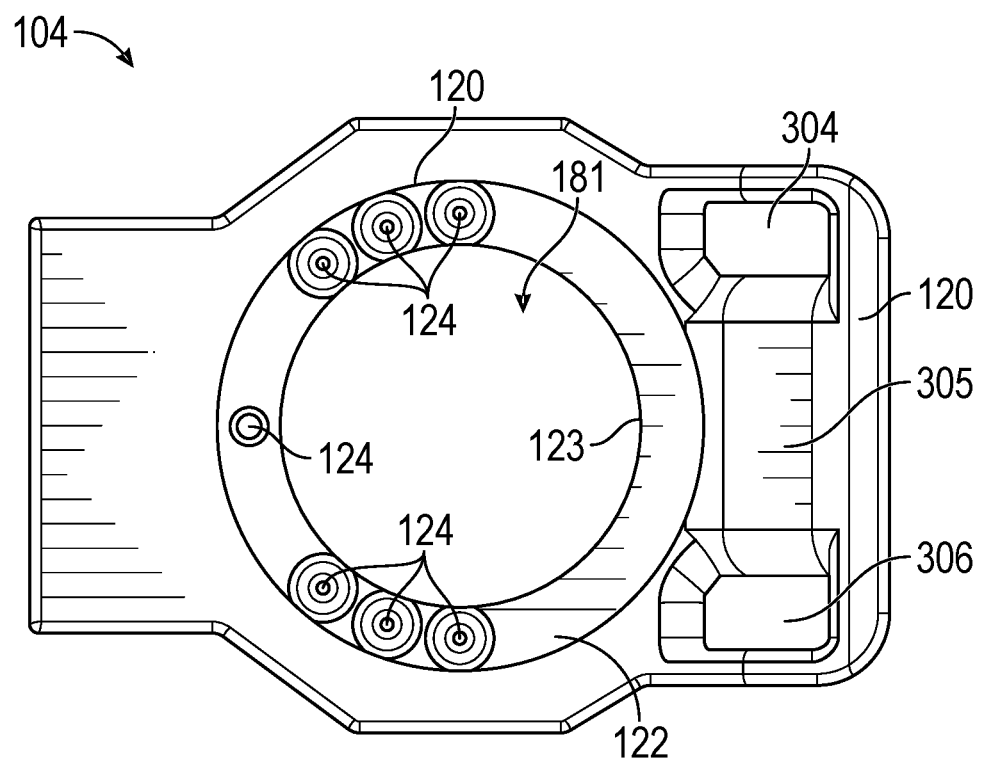
Figure 3A:
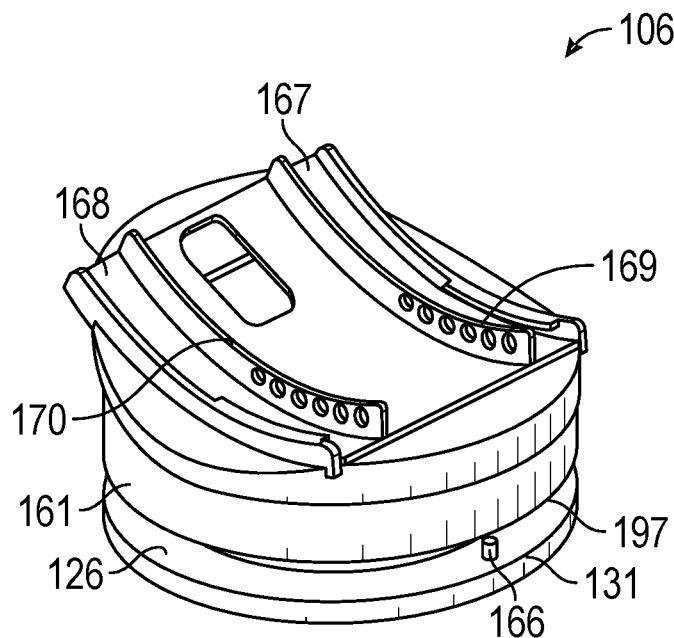
FIGS. 3A-B illustrate perspective and side elevation views of the rotating pedestal for the child car seat of FIGS. 1A-F in accordance with one example embodiment of the disclosure.
Figure 3B:
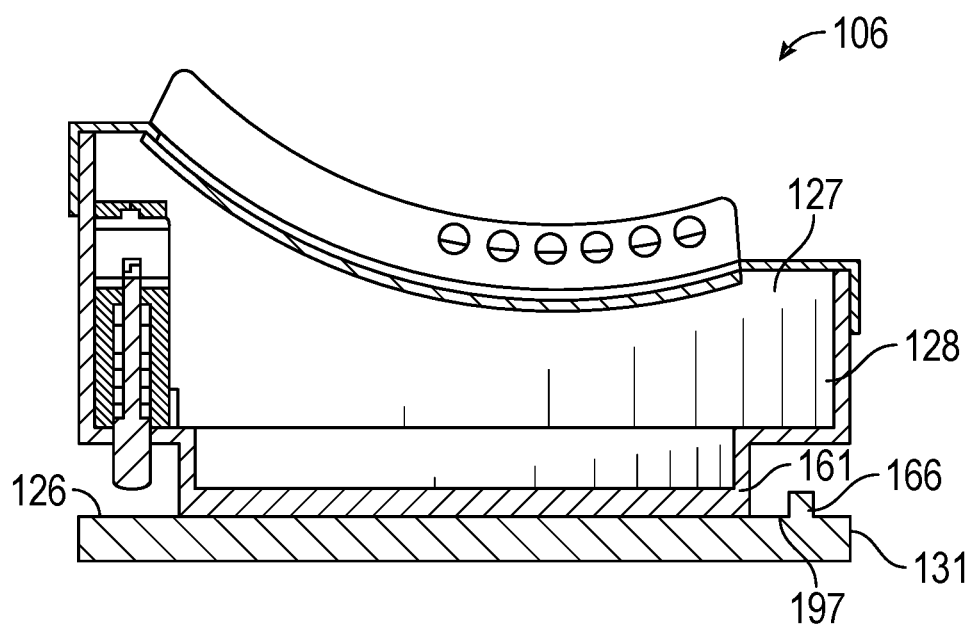

FIG. 1A presents a perspective view of a rotatable automobile child car safety seat 100 in accordance with one example embodiment of the disclosure. FIG. 1B presents a side elevation view of the rotatable automobile child car safety seat 100 of FIG. 1A. FIG. 1C presents a front elevation view of the rotatable automobile child car safety seat 100 of FIGS. 1A-B in accordance with one example embodiment of the disclosure. FIG. 1D presents a rear elevation view of the rotatable automobile child car safety seat 100 of FIGS. 1A-C in accordance with one example embodiment of the disclosure. FIG. 1E presents a cross-sectional view of the rotatable automobile child car safety seat 100 of FIGS. 1A-D in accordance with one example embodiment of the disclosure. FIG. 1F is a partial cross-sectional view of the rotatable automobile child car safety seat 100 of FIGS. 1A-E in accordance with one example embodiment of the disclosure. FIGS. 2A-B present perspective and top plan views of a seat base 104 for the rotatable automobile child car safety seat 100 of FIGS. 1A-F in accordance with one example embodiment of the disclosure. FIGS. 3A-B present perspective and side elevation views of the rotating pedestal 106 for the rotatable automobile child car safety seat 100 of FIGS. 1A-F in accordance with one example embodiment of the disclosure.

Now referring to FIGS. 1A-3B, the example rotatable automobile child car safety seat 100 can include a seat shell 102. The rotatable child safety seat 100 can include a seat base 104 disposed beneath the seat shell 102, and a rotating pedestal 106 disposed generally between the seat base 104 and the seat shell 102. In one example, the seat shell 102 can be coupled to the rotating pedestal 106 and the rotating pedestal 106 can be rotatably coupled to or be rotatable within the seat base 104.

The seat shell 102 of the car seat 100 can be made of any material including, but not limited to, plastic, metal, composite, or a combination thereof. In one example embodiment, the seat shell 102 can be formed of a molded plastic and can include a front side, for receiving a child therein, and an opposing rear side. The front side of the seat shell 102 can include a seat back 110 or backrest and a seat bottom 108, upon which a child can sit. The seat shell 102 can also include a pair of side retaining walls 112 extending forward from the seat back 110 at or adjacent to the opposing, vertically-extending lateral sides of the seat back 110. In one example, the side retaining walls 112 are configured to limit side-to-side movement of the child while in the car seat 100 and can be integrally formed with the seat shell 102 or coupled to a portion of the seat back 110. All or a portion of the seat shell 102 can be covered in padding and/or soft goods (e.g., padding, fabric, leather, faux leather, and/or another material) to increase the comfort level of sitting in the car seat 100.

The rotatable automobile child car safety seat 100 can also include a first central adjuster (not shown) disposed generally along the front side 135 of the seat bottom 108 of the seat shell 102. The first central adjuster can include a slot or passageway (not shown) disposed through the seat shell 102 of the car seat 100 that extends from the front 135 or top side of the seat bottom 108 to a bottom side 133 of the seat bottom 108 under the seat shell 102. In one example, the slot can define an opening to and provide a passageway through the seat shell 102 from the bottom side 133 of the seat bottom 108 to a front side 135 of the seat bottom 108. In certain example embodiments the slot further provides a passageway from the front side 135 of the seat bottom 108 to a rear side of the seat shell 102 (e.g., along the rear side of the seat back 110).

The rotatable automobile child car safety seat 100 can also include a pair of armrests (not shown). Each armrest can be positioned above the top surface 129 of the seat bottom 108. For example, each armrest can be coupled to or integrally formed with the seat shell 102 of the car seat 100 along opposing lateral sides of the seat bottom 108. The car seat 100 can also include a child restraint system (not shown). The child restraint system can include at least a pair of shoulder straps or belts. Each of the shoulder belts can include a first end and a distal second end. The first end of each shoulder belt can be removably coupled directly or indirectly to the seat shell 102 of the car seat 100. In one example embodiment, each first end of each shoulder belt may be threaded through or otherwise slidably attached and adjustable along a chest harness (not shown). The chest harness can be removably coupled to a chest harness clip (not shown). In one example, the chest harness can include a latch plate (not shown) that is configured to be removably coupled to the chest harness clip. For example, the chest harness clip can be coupled directly or indirectly to the seat shell and can include a latch (not shown) having a release mechanism. The latch can be configured to receive the latch plate and couple the chest harness to the chest harness clip. The release mechanism is configured to disengage the chest harness from the chest harness clip by, for example, releasing the latch plate from the latch.

The second end of each of the shoulder belts can be coupled to one end of a strap tensioning mechanism that is positioned along the rear side 113 of the seat back 110 of the seat shell 102. For example, each shoulder belt can be fed through one of multiple harness slots (not shown) in a seat back 110 of the seat shell 102. Each harness slot can define a passageway from the front side 111 to the rear side 113 of the seat back 110 of the seat shell 102. In one example, the multiple harness slots can be paired (such that each receives one of the at least two shoulder belts) and oriented vertically along the seat back 110 of the seat shell 102 to provide a vertical positioning adjustment for the shoulder belts as they pass from the front side 111 of the seat back 110 to the rear side 113 of the seat back 110. In one example, four pairs of harness slots are oriented vertically along the seat back 110 of the seat shell 102. However, greater or fewer numbers of harness slots can be provided along the seat back 110.

The seat base 104 can include a bottom surface 118, one or more side walls 120 that extend generally vertically upward from the bottom surface 118, and one or more retaining flanges 122 or rims. In one example, the retaining flange 122 can be a portion of the seat base 104 that extends radially inward from the one or more side walls 120, such that the side wall defines a first inner wall, the retaining flange 122 defines a second inner wall and the diameter of the second inner wall is less than the diameter of the first inner wall. This results in the flange 122 reducing the size and/or diameter of the opening 181 into the seat base 104. The flange 122 is also configured to assist in holding or maintaining a rotating pedestal base 126 within a cavity 125 of the seat base 104 positioned below the retaining flange 122.

The side wall of the seat base 104 can include one or more side walls that extend around the outer edge of the bottom surface 118 of the seat base 104. Further, the seat base 104 can include an inner wall surface 191 that, along with the bottom surface 118 and the flange 122 define the cavity 195. The inner wall surface 191 can extend orthogonally from the bottom surface 118 in certain example embodiments. In other embodiments, the inner wall surface 191 can extend at an acute or orthogonal angle to the bottom surface 118. In one example, the inner wall surface 191 can define another annular ring-shaped opening along the bottom side of the seat base 104 that has a diameter that is greater than the diameter of the diameter of the opening defined by the second inner wall of the retaining flange. The bottom surface 118 can include a bottom side that is flat or substantially flat and configured to rest upon a top surface of an automobile seat 202 (see FIG. 4).

In one example, a single retaining flange 122 is provided and the retaining flange 122 is formed along an inner wall of the one or more side walls 120 and extends radially inward from the side walls 120 toward the rotational axis Y of the rotating child car seat 100. The example retaining flange 122 can have an inner wall 123 that defines, for example, an annular ring disposed above and vertically separated from the bottom surface 118.

Figure 5A:
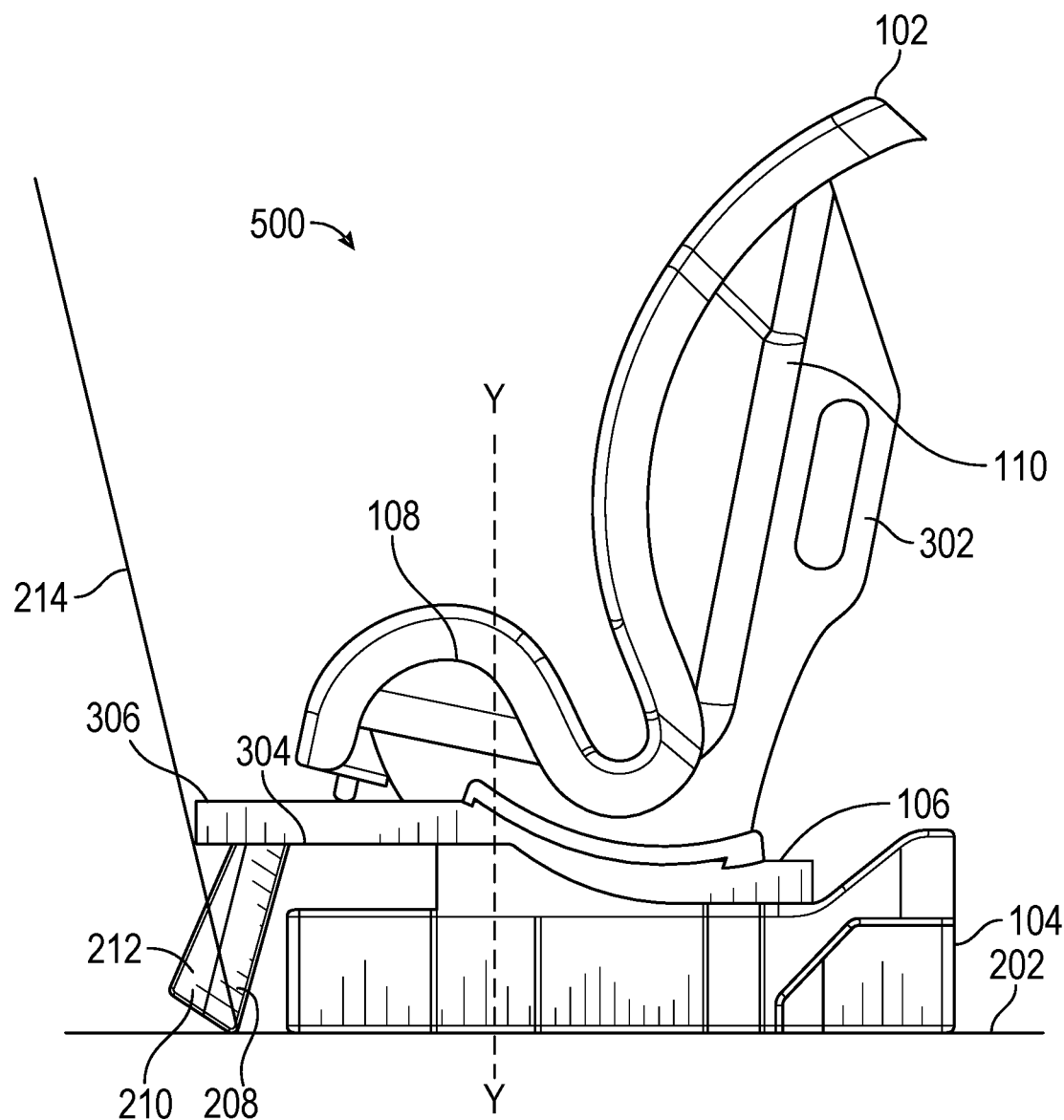
FIG. 5A is a side elevation view of the rotatable child car seat of FIGS. 1A-B installed in the rearward-facing configuration in accordance with one example embodiment of the disclosure.

The retaining flange 122 or another portion of the seat base 104 can also include one or more pin receiving cavities or apertures 124. Each pin receiving cavity or aperture 124 can provide an indentation, cavity, passageway, or channel through all or a portion of the retaining flange 122 and/or side wall 120 from above or along the side of the seat base 104. In certain example embodiments, one or more of the pin receiving cavities or apertures 124 can provide a passageway or channel that extends from a top side of the flange 122 into the cavity 125 positioned below the flange 122. Each pin receiving cavity or aperture 124 is sized and shaped to receive at least a portion of a locking pin 134 therein. In certain example embodiments, the pin receiving cavity or aperture 124 may only extend through a portion of the retaining flange 122 and/or wall 120 rather than all of the way through it. In certain example embodiments, the seat base 104 can include multiple pin receiving cavities or apertures 124 (e.g., any number of cavities or apertures 124 between 1-20). In one example, seven pin receiving apertures 124 are provided in the retaining flange 122 and spaced substantially around the annular ring of the flange 122. In another example embodiment, four pin receiving cavities or apertures 124 are provided in the retaining flange 122 and spaced substantially 90 degrees apart. In other example embodiments, three pin receiving cavities or apertures 124 are provided and the seat 100 is configured to rotate only 90 degrees to the left and the right about the rotational axis Y from an initial position or aperture 124. In one example, the initial position can be with the car seat 100 facing in the rear-facing position, as shown in FIG. 5A.

The seat base 104 can include a cavity 125 positioned between the bottom surface 118 and the retaining flange member(s) 122. This cavity 125 can be configured to receive and retain therein a rotating pedestal base 126. For example, the cavity 125 can have a generally cylindrical shape with a diameter that is greater than the diameter of the rotating pedestal base 126.

The seat base 104 can also include a tab channel (not shown) disposed in and extending along a bottom side of the flange 122. The channel can be elongated and arcuate in shape. The channel can have a width and is configured to receive at least a portion of a rotation limiter tab 166 therein. The channel can have a first end wall and a distal second end wall that limit the range of rotation of the rotating pedestal base 126 through contact with the rotation limiter tab 166.

The rotating pedestal 106 can include a first end 127 coupled to the seat shell 102 and a distal second end 197 coupled to the pedestal base 126. In one example embodiment, the rotating pedestal 106 has a generally cylindrical shape with a circular cross-sectional shape along an axis orthogonal to the rotational axis Y. The rotating pedestal 106 can have a constant or variable diameter. For example, the rotating pedestal 106 can include a first portion 128 having a first diameter and a second portion 161 having a generally cylindrical shape and a second diameter that is less than the first diameter and less than the diameter of the pedestal base 126. In one example, at least a portion of the diameter of the rotating pedestal 106 (e.g., the second portion 161) is less than the diameter of the opening defined by the inner wall 123 of the retaining flange 122 and less than the diameter of the rotating pedestal base 126. The pedestal base 126 can be coupled to or integrally formed with the second end 197 of the rotating pedestal 106 and can be configured to be positioned below the retaining flange 122. For example, the pedestal base 106 can be coupled to the bottom side of the second portion 161 of the rotating pedestal 106 using screws, bolts or other coupling devices. In one example, the pedestal base 126 has a diameter that is greater than the diameter of the opening defined by the inner wall 123 of the retaining flange 122. This greater diameter for the pedestal base 126 prevents the pedestal base 126 from being lifted vertically and removed from or falling out of the cavity 125. In certain example embodiments, the pedestal base 126 can include an outer perimeter wall 131. In one example, the outer perimeter wall 131 extends at an angle orthogonal or substantially orthogonal to the bottom surface 118 of the seat base 104. In another example embodiment, the outer perimeter wall 131 can extend at a complementary angle to the angle of the inner wall surface 191 of the seat base 104.

The pedestal base 126 can also include a rotation limiter tab 166. The rotation limiter tab 166 can be a member that extends up from a top side of the pedestal base 126. In one example, the rotation limiter tab 166 can have a substantially cylindrical shape. In other embodiments, the rotation limiter tab 166 can have any other shape. At least a portion of the rotation limiter tab 166 is configured to extend into and move along the tab channel in the bottom side of the flange 122. Contact by the rotation limiter tab 166 with one of the end walls of the tab channel will prevent further rotation of the pedestal 106 and seat shell 102.

The rotating pedestal 106 can also include a first portion 128 having a larger diameter than the second portion 161 and positioned vertically above the second portion 161. In one example, this first portion extends from the second portion 161 to the first end 127. In another example embodiment, the first portion can be a pedestal flange 128 that extends out from the outer surface of the pedestal 106 and is positioned between the second portion 161 and the first end 127. In one example, a first portion 128 extends radially outward from the second portion 161 and has an outer perimeter that is ring-shaped or substantially ring-shaped. The example first portion or pedestal flange 128 can have an outer diameter that is greater than the diameter of the opening defined by the inner wall 123 of the retaining flange 122.

A locking pin 134 can be positioned within or may be operably coupled to the first portion 128. For example, the first portion 128 of the rotatable pedestal 106 can include a cavity configured to receive therein the locking pin 134. The cavity can include an opening along a bottom side of the first portion 128 of the rotatable pedestal 106 through which at least a portion of the locking pin 134 can extend. The locking pin 134 can be movable from a locked position to an unlocked position. In one example embodiment, the locking pin 134 can include a spring or other biasing mechanism to bias the locking pin 134 in the locked position (e.g., downward towards the retaining flange 122).

The rotatable child car seat 100 can also include a locking pin release mechanism 130. In one example, the locking pin release mechanism 130 is coupled to and operably adjustable along the seat shell 102. For example, the locking pin release mechanism 130 can be positioned along the seat bottom 108 on the side of the seat shell 102 or along the front or rear sides of the seat bottom 108. In other examples, the locking pin release mechanism 130 can be positioned along the pedestal 106 or seat base 104. The locking pin release mechanism 130 can be a rotating lever, adjustable switch, pull-tab, press-button, or any other hand-operated mechanism.

The locking pin release mechanism 130 can also include a spring or other biasing member that biases the locking pin release mechanism 130 in a first position and allows at least a portion of the locking pin release mechanism 130 to be manipulated by hand application of a force into a second position (e.g., rotation, translation, extension, etc.). The locking pin release mechanism 130 can then automatically return to the first position due to the biasing force being applied by the spring or other biasing member once the force is no longer being applied to the locking pin release mechanism 130. In one example, the spring is a torsion spring.

A cable wire, tether, or string 132 can be coupled along a first end 132A to the locking pin release mechanism 130 and along a distal second end 132B to the locking pin 134. In one example, the cable 132 can be routed along the back side 113 of the seat shell 102, about a friction reducing member 136, such as a pulley, roller, or radiused or otherwise smooth surface, and to the locking pin 134.

In operation, as shown in FIG. 1F, the locking pin release mechanism 130 can be a rotating lever that can be spring-biased in a first position and manually rotated in the direction R1 to overcome the spring-bias of the spring or other biasing member and into the second position. The rotation of the locking pin release mechanism 130 applies a tension to the cable 132, which overcomes the spring-bias of spring or other biasing member applying a downward force on the locking pin 134 that biases the pin 134 into the pin receiving aperture 124 and pulls the locking pin 134 generally vertically upward out of the pin receiving aperture 124 in the flange 122. This allows the pedestal base 126, first portion 128 and second portion 161 of the pedestal 106, and seat shell 102 to rotate in either direction about the rotational axis Y with respect to the seat base 104. Once manual force is reduced on the locking pin release mechanism 130, the spring-biasing force on the mechanism 130 will cause it to rotate in the direction opposite R1. This will reduce the tension on the cable 132 and allow the spring-biasing force on the locking pin 134 to move the locking pin 134 from the unlocked position generally downward towards the locked position. Once the rotation of the car seat 100, pedestal 106, and pedestal base 126 about the rotational axis Y aligns the locking pin 134 with another pin receiving aperture 124 or cavity in the seat base 104, the locking pin 134 will enter that opening 124 or cavity and lock the car seat 100, first portion 128 and second portion 161 of the pedestal 106, and the pedestal base 126 rotationally in place with respect to the seat base 104.

The rotating pedestal 106 can also include reclining channels 167, 168 and recline stop position apertures 169, 170. At least a portion of the seat shell 102 can ride within the reclining channels 167, 168 to allow the seat shell 102 to be reclined at different angles with respect to the pedestal 106. Position stop tabs (not shown) can be coupled to the seat shell and operably coupled to a stop tab release mechanism 171. The stop tab release mechanism 171 can be a rotating lever, adjustable switch, pull-tab, press-button, or any other hand-operated mechanism. The stop tab release mechanism can include a spring or other biasing devices to bias the stop tab release mechanism into a first position, in which each position stop tab engages one of the recline stop position apertures 169, 170. Each position stop tab can be coupled to the stop tab release mechanism 171 via one or more cables, wires, or tethers. While six recline positions are shown in FIGS. 3A-B, this is for example purposes only, as greater or fewer recline positions and angles can be provided based on the number and positioning of the recline stop position apertures 169, 170.

The example rotatable child car seat 100 can further include two separate and distinct seat belt and/or LATCH tether attachment areas or pathways, which will be described in greater detail with regard to FIGS. 1A-2B and 4-5B. A first seat belt and/or LATCH tether attachment area or pathway can be positioned along the rear side 113 of the seat back 110 of the seat shell 102. When an automobile seat belt or tether of the LATCH system is attached to the first seat belt and/or LATCH tether attachment area or pathway 203, 302, rotation of the seat shell 102 and pedestal 106 with respect to the seat base 104 is prevented or significantly limited because rotation of the seat shell 102 and pedestal 106 would require that the seat belt or LATCH tether attached to the seat shell 102 also extend and rotate with the seat shell 102 and pedestal 106. The first seat belt and/or LATCH tether attachment area or pathway 203, 302 is used when the rotatable child car seat 100 is placed in a forward-facing configuration with regard to an automobile seat (see FIG. 4). Forward-facing configurations are typically used for children who are older and better able to position themselves in the car seat. In addition, parents or guardians are also typically more experienced with coupling and decoupling a child from a car seat once the child is old enough to sit in the car seat 100 in the forward facing configuration.

A second seat belt and/or LATCH tether attachment area or pathway 304, 306 can be positioned along the rear side of the seat base 104. When the automobile seat belt or tether of the LATCH system is attached to or routed through the second seat belt and/or LATCH tether attachment area or pathway 304, 306, rotation of the car seat 100 with respect to the seat base 104 can be accomplished in the manner described above with reference to FIGS. 1A-5B. The second seat belt and/or LATCH tether attachment area or pathway 304, 306 is used when the rotatable child car seat 100 is placed in a rearward-facing configuration with regard to the automobile seat (see FIG. 5A). Rearward-facing configurations are typically used for infants and younger toddler children who are unable to position themselves in the car seat 100 or may have less-developed fine motor and musculature development. Parents of these younger children may also be less experienced in dealing with coupling and decoupling the child from the car seat 100.

Figure 4:
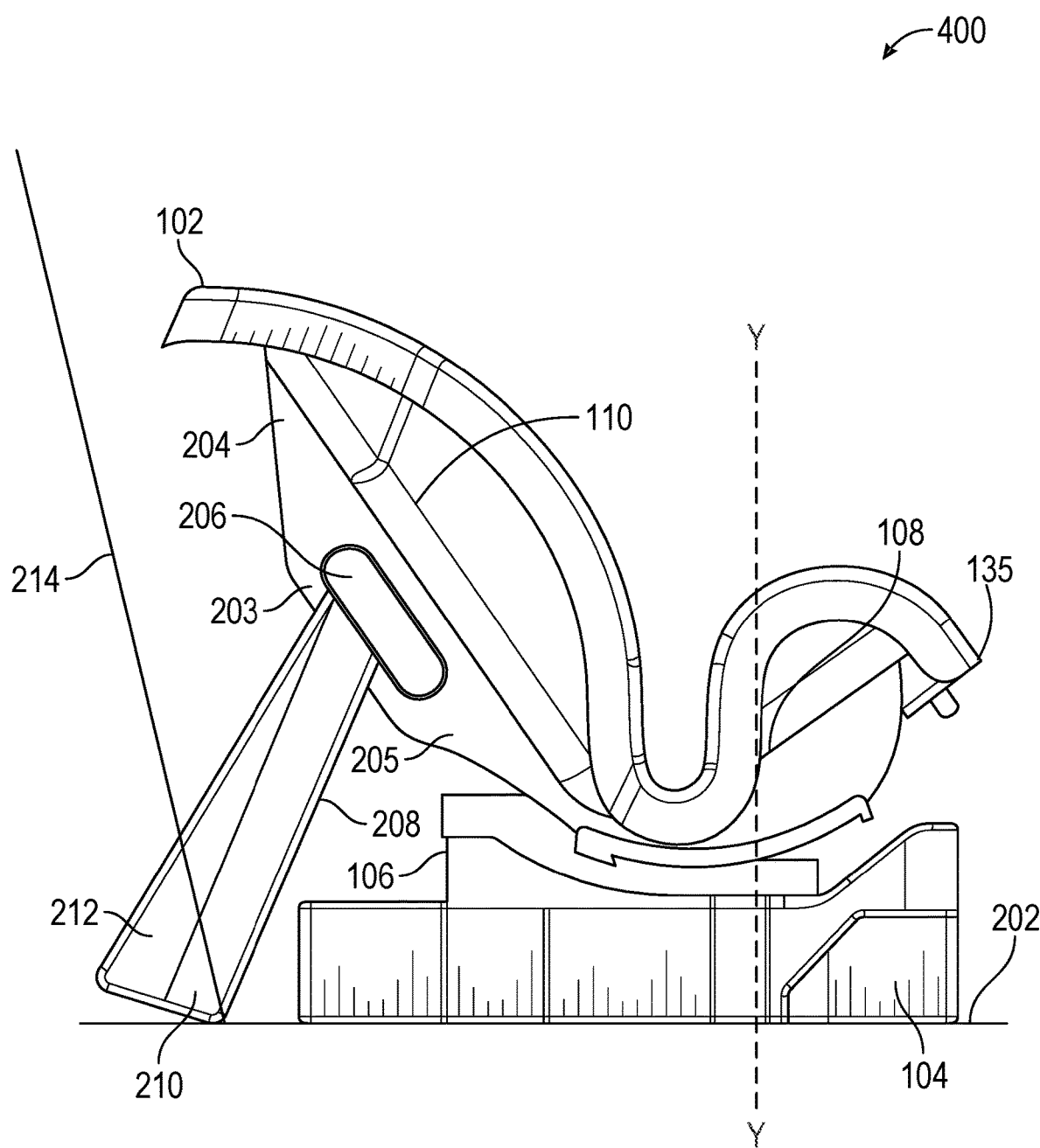
FIG. 4 is a side elevation view of the rotatable child car seat of FIGS. 1A-B installed on an automobile seat in a forward-facing configuration in accordance with one example embodiment of the disclosure.

FIG. 4 is a side elevation view 400 of the rotatable child car seat 100 installed on an automobile seat 202 in a forward-facing configuration, in accordance with one example embodiment of the disclosure. Referring now to FIGS. 1A-4, the rotatable child car seat 100 is positioned in the forward-facing configuration in an automobile, such that the front 135 of the seat shell 102 faces towards the front of the automobile. The seat base 104 rests along the top surface of the automobile seat bottom 202, the seat back 110 of the seat shell 102 is positioned adjacent the front side of the automobile seat back 214, and the child typically faces toward the front of the automobile. The rotatable child car seat 100 can further include the first seat belt and/or LATCH tether attachment area or pathway 203, 302. In one example, the first seat belt and/or LATCH tether attachment area or pathway includes a first seat belt attachment arm 203 and a second seat belt attachment arm 302 (see FIG. 1D). Each of the seat belt attachment arms 203, 302 have a first end 205 coupled to the back side 113 of the seat shell 102 and a distal second end 204 coupled to the back side 113 of the seat shell 102. Each of the seat belt attachment arms 203, 302 can be generally elongated members that each define an opening 206 for receiving an automobile seat belt 208 or LATCH tether therethrough between the respective seat belt attachment arm 203, 302 and the back side 113 of the seat shell 102.

The automobile seat belt 208 can be either a two-point or three-point seat belt and can have a first end 210 coupled to the automobile and a distal second end 212 that can be routed through the openings 206 defined by each seat belt attachment arm 203, 302 and then latched to a latch with a latch plate disposed along the second end 212.

The LATCH tether can include a tether, strap, or elongated piece of material similar to the belt material of the automobile seat belt. One end of the LATCH tether can include a first lower anchor connector (e.g., a latch (e.g., a spring-loaded latch), clip (e.g., a spring-loaded clip), caribiner (e.g., a spring-loaded caribiner), or other coupling device). A distal second end of the LATCH tether can include a second lower anchor connector (e.g., a latch (e.g., a spring-loaded latch), clip (e.g., a spring-loaded clip), caribiner (e.g., a spring-loaded caribiner), or other coupling device). Each of the first lower anchor connector and second lower anchor connector are configured to be removably coupled to corresponding automobile anchors, which may be positioned along the floorboard of the automobile, between the seat bottom and seat back of the automobile seat, along the back side of the seat back of the automobile seat, and/or along the ceiling of the automobile. The first lower anchor connector can be removably coupled to one automobile anchor. The ANCHOR tether can be routed through the openings 206 defined by each seat belt attachment arm 203, 302, and then the second lower anchor connector can be removably coupled to a second automobile anchor.

As the seat belt 208 or ANCHOR tether is routed through the first seat belt and/or LATCH tether attachment area or pathway of the rotatable child car seat 100, which is directly coupled to the seat shell 102 by way of the seat belt attachment arms 203, 302, the seat shell 102 and pedestal 106 are prevented from being rotatable about the rotational axis Y with respect to the seat base 104.

FIG. 5A is a side elevation view 500 of the rotatable child car seat 100 installed in the rearward-facing configuration, in accordance with one example embodiment of the disclosure. Referring now to FIGS. 1A-3B and 5A, the rotatable child car seat 100 is positioned in the rearward-facing configuration in an automobile, such that the front 135 of the seat shell 102 faces towards the rear of the automobile. The seat base 104 rests along the top surface of the automobile seat bottom 202, the seat back 110 of the seat shell 102 is positioned away from the front side of the automobile seat back 214, and the child typically faces toward the rear of the automobile.

The rotatable child car seat 100 can further include a second seat belt and/or LATCH tether attachment area or pathway 304, 306 positioned separately from the first seat belt and/or LATCH tether attachment area or pathway defined by arms 203, 302 described above. The second seat belt and/or LATCH tether attachment area or pathway 304, 306 can include a first seat belt and/or LATCH tether aperture 304 disposed though a rear side of the side wall 120 of the seat base 104 and extending to the top side or front side of the seat base 104 and a second seat belt and/or LATCH tether aperture 306 disposed though a rear side of the side wall 120 of the seat base 104 and extending to the top side or front side of the seat base 104. Each of the first 304 and second 306 seat belt and/or LATCH tether apertures provide a passageway through at least a portion of the seat base 104 for receiving an automobile seat belt 208 and/or LATCH tether therethrough. A portion of the seat base 104 (e.g., a separation wall 305) can extend between the first aperture 304 and the second aperture 306.

The automobile seat belt 208 can be either a two-point or three-point seat belt and can have a first end 210 coupled to the automobile and a distal second end 212 that can be routed through the openings 304 and 306 and then latched to a latch with a latch plate disposed along the second end 212 of the seat belt. For example, the seat belt 208 can be routed under the seat base 104, extend up through the first seat belt and/or LATCH tether aperture 304, pass over the separation wall 305 along the top side of the seat base 104, extend through the second seat belt and/or LATCH tether aperture 306 from the top side down towards the bottom side of the seat base 104 and extend out from the bottom side 118 of the seat base 104.

The LATCH tether can be the same as described above. The LATCH tether can have the first lower anchor connector removably coupled to one automobile anchor. The ANCHOR tether can be routed through the openings 304 and 306, and then the second lower anchor connector can be removably coupled to a second automobile anchor. For example, the LATCH tether can be routed under the seat base 104, extend up through the first seat belt and/or LATCH tether aperture 304, pass over the separation wall 305 along the top side of the seat base 104, extend through the second seat belt and/or LATCH tether aperture 306 from the top side down towards the bottom side of the seat base 104 and extend out from the bottom side 118 of the seat base 104.

As the seat belt 208 and/or LATCH tether is routed through the second seat belt attachment and/or LATCH tether area or pathway of the rotatable child care seat 100, which is the seat base 104, the seat shell 102 (and the pedestal 106 and pedestal base 126) can continue to rotate with respect to the seat base 104 about the rotational axis Y when manually activated by a user as described herein.

Figure 5B:
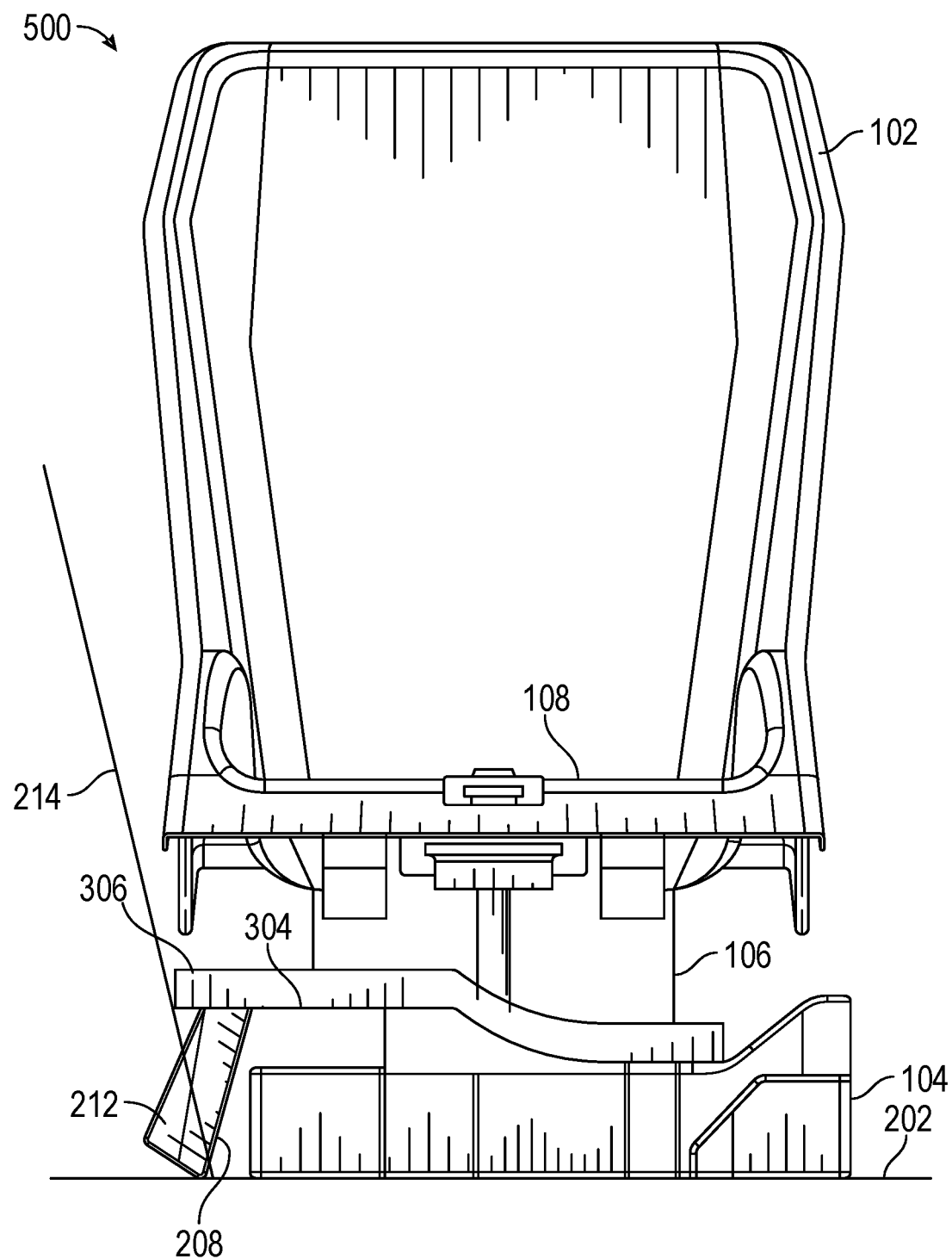
FIG. 5B is the same side elevation view as FIG. 5A with the car seat rotated about 90 degrees in accordance with one example embodiment of the disclosure.

FIG. 5B shows the seat shell 102, pedestal 106, and pedestal base having been rotated counter-clockwise about 90 degrees as compared to FIG. 5A, while the seat base 104 remains coupled to the seat belt 208 of the automobile or the LATCH tether. While the seat shell 102 of FIG. 5B is shown to have rotated counter-clockwise, it also could have been rotated clockwise anywhere in the range of 1-360 degrees, including but not limited to 30, 45, 60, 75, 90, 180, and 270 degrees, if desired by the user. In addition, while the seat shell 102 of FIG. 5B is shown as having been rotated counter-clockwise 90 degrees, it could have additionally been rotated 30, 45, 60, 75, 90, 180, 270 or any other amount of degrees between 1-360 degrees if desired by the user.

Figure 6A:
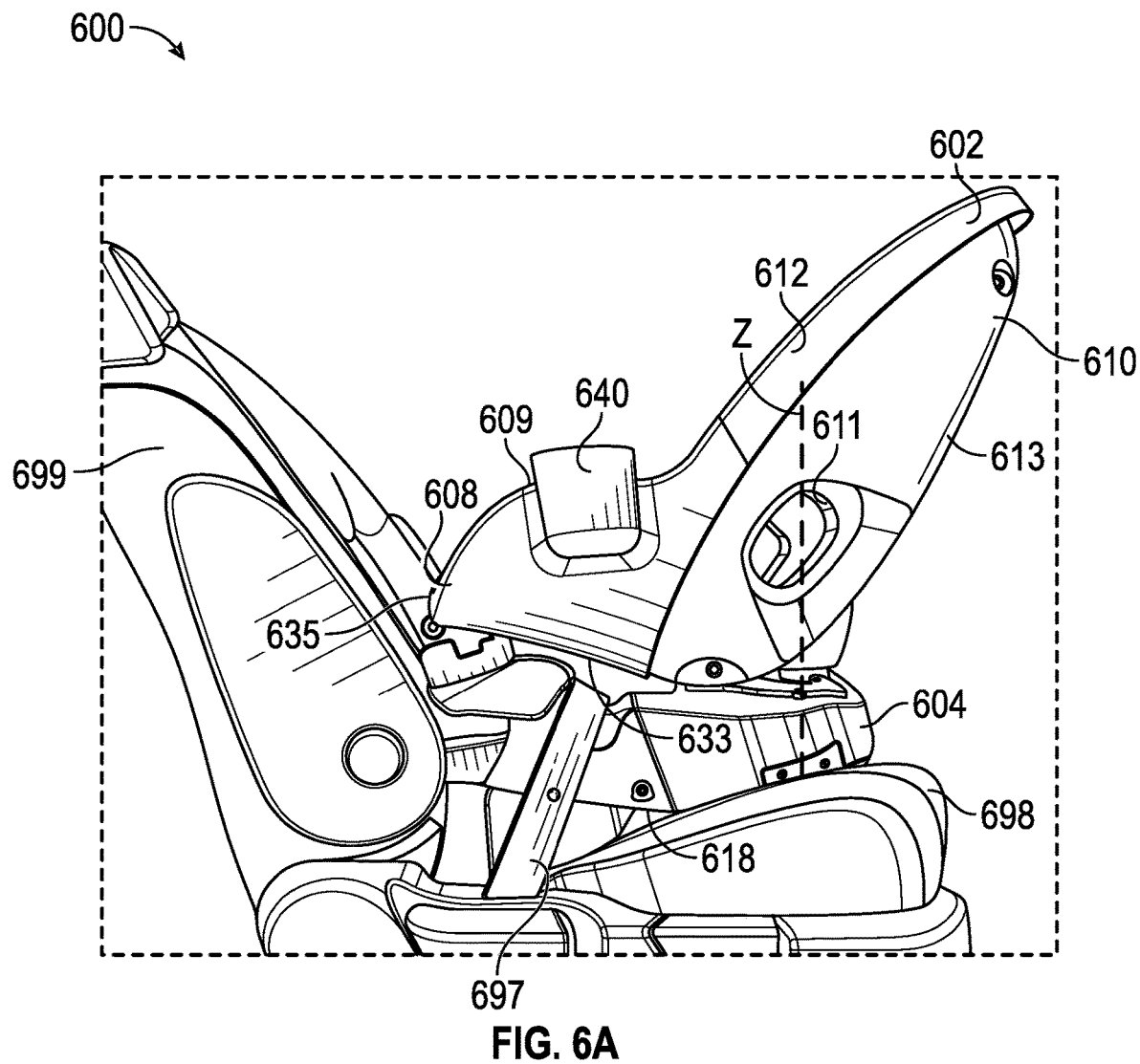
FIG. 6A is a side elevation view of another rotatable child car seat in accordance with another example embodiment of the disclosure.
Figure 6B:
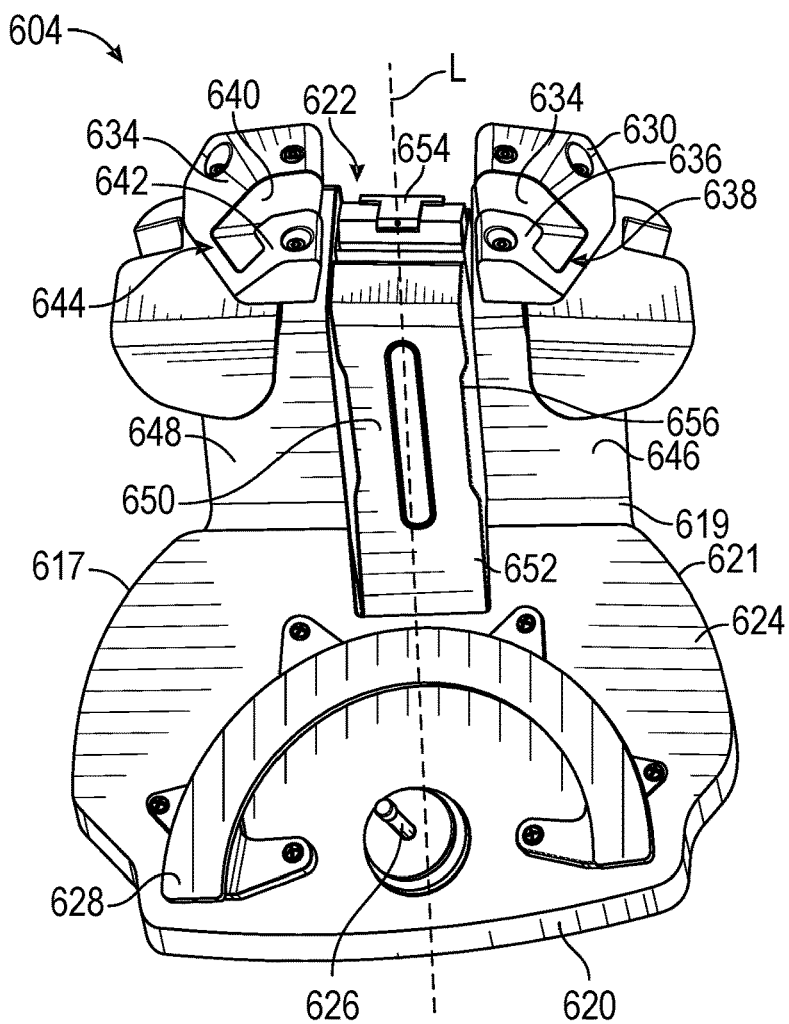
FIG. 6B is a top perspective view of a base for the rotatable child car seat of FIG. 6A in accordance with one example embodiment of the disclosure.
Figure 6C:
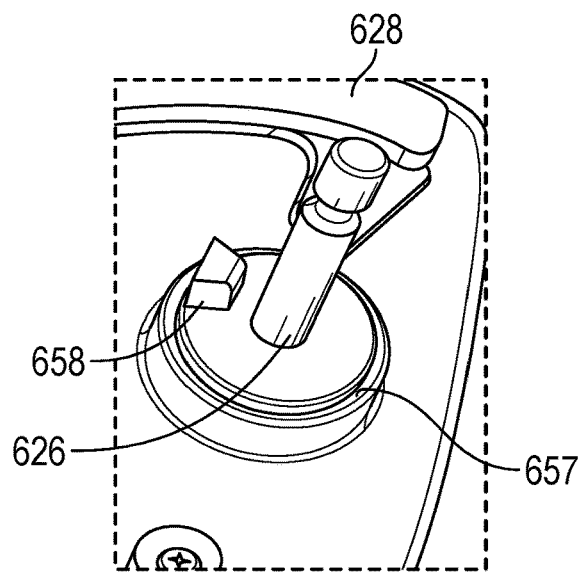
FIG. 6C is a partial top perspective view of the rotation axle and rotation stop on the base for the rotatable child car seat of FIGS. 6A-B in accordance with one example embodiment of the disclosure.
Figure 6D:
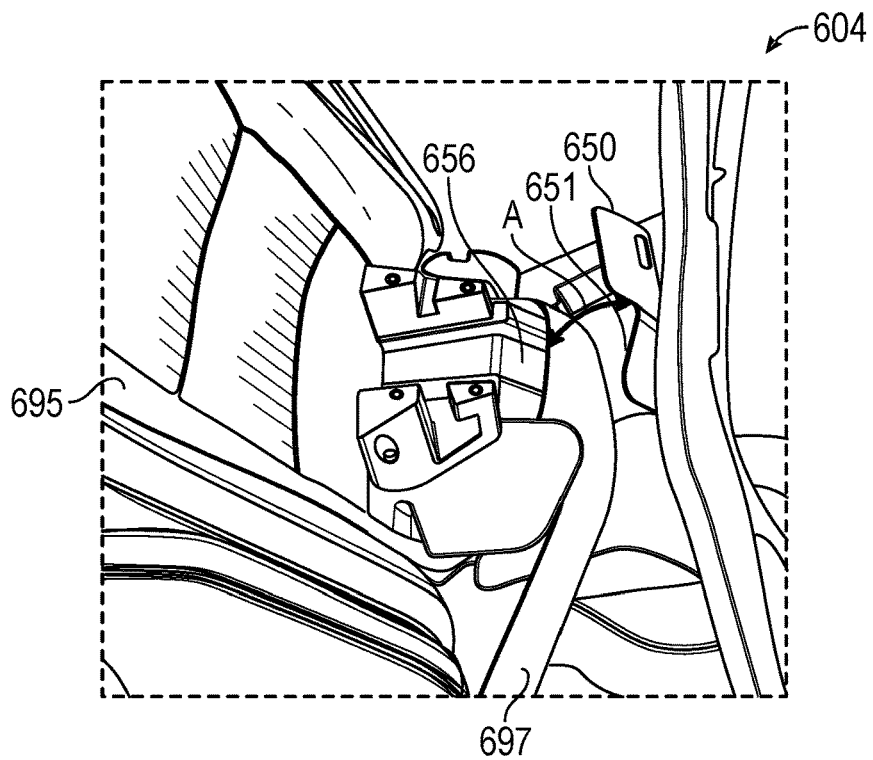
FIG. 6D is another top perspective view of the base of FIG. 6B in accordance with one example embodiment of the disclosure.
Figure 6E:
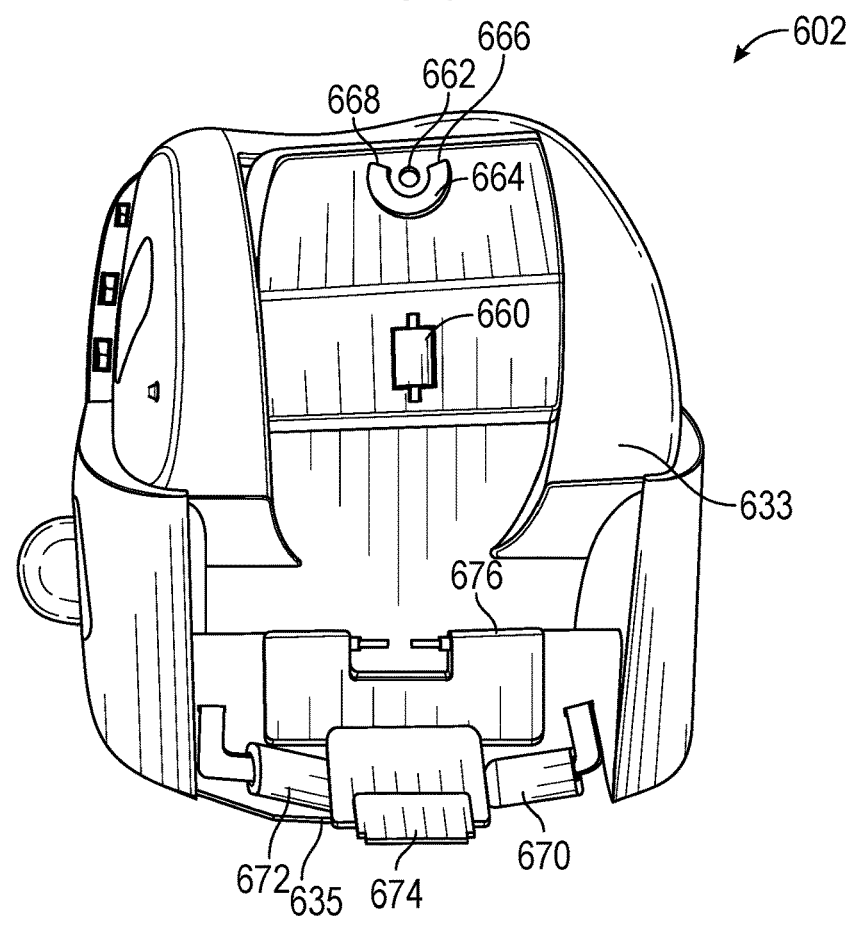
FIG. 6E is a bottom perspective view of a seat shell for the rotatable child car seat of FIG. 6A in accordance with one example embodiment of the disclosure.
Figure 6F:
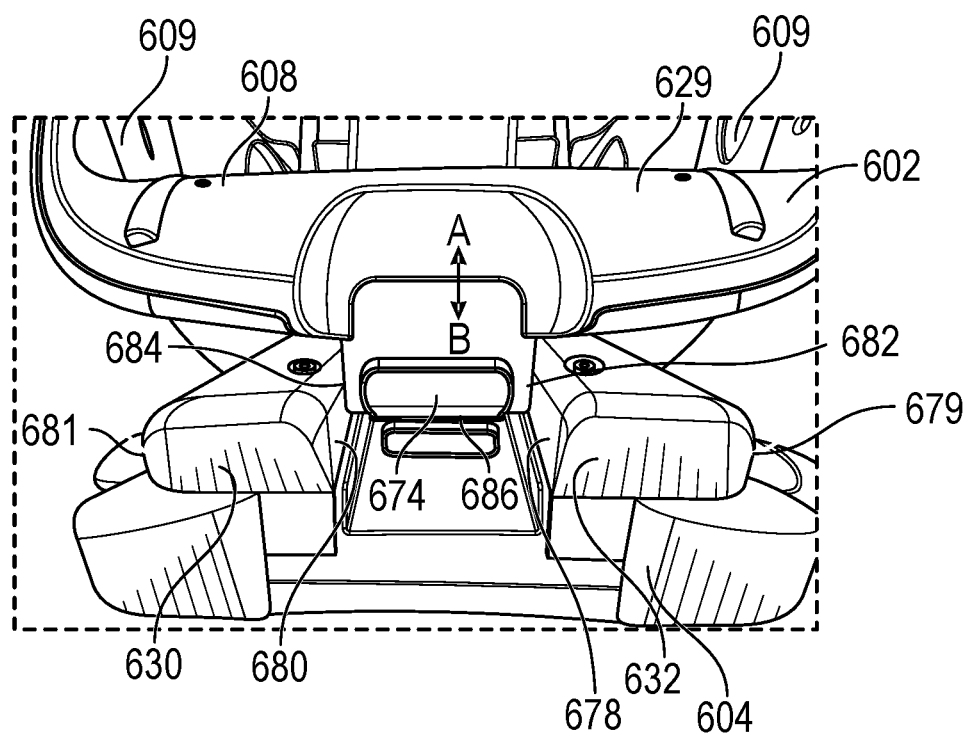
FIG. 6F is a partial front elevation view of the seat rotation locking mechanism for the rotatable child car seat of FIG. 6A in accordance with one example embodiment of the disclosure.
Figure 6G:
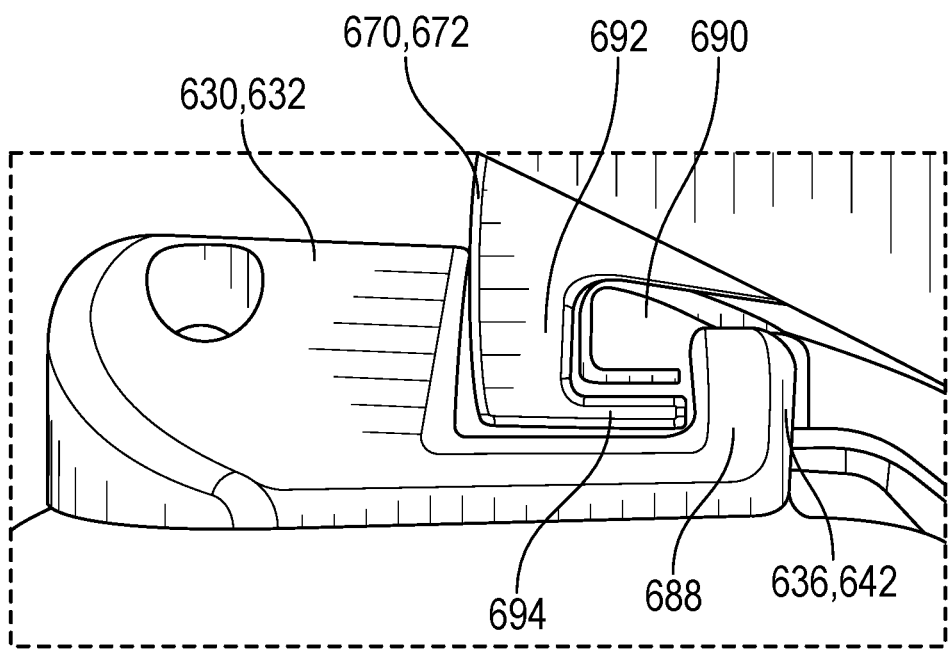
FIG. 6G is a partial side elevation view of the seat rotation locking mechanism for the rotatable child car seat of FIG. 6A in accordance with one example embodiment of the disclosure.

FIG. 6A is a side elevation view of another rotatable child car seat 600 in accordance with another example embodiment of the disclosure. FIG. 6B is a top perspective view of a base 604 for the rotatable child car seat 600 of FIG. 6A in accordance with one example embodiment of the disclosure. FIG. 6C is a partial top perspective view of the rotation axle 626 and rotation stop 658 on the base 604 for the rotatable child car seat 600 of FIGS. 6A-B in accordance with one example embodiment of the disclosure. FIG. 6D is another top perspective view of the base 604 of FIG. 6B in accordance with one example embodiment of the disclosure. FIG. 6E is a bottom perspective view of a seat shell 602 for the rotatable child car seat 600 of FIG. 6A in accordance with one example embodiment of the disclosure. FIG. 6F is a partial front elevation view of the seat rotation locking mechanism for the rotatable child car seat 600 of FIG. 6A in accordance with one example embodiment of the disclosure. FIG. 6G is a partial side elevation view of the seat rotation locking mechanism for the rotatable child car seat 600 of FIG. 6A in accordance with one example embodiment of the disclosure.

Now referring to FIGS. 6A-G, the example rotatable automobile child car safety seat 600 can include a seat shell 602 and a seat base 104 disposed beneath the seat shell 602. In one example, the seat shell 602 can be removably coupled to the seat base 604 and can rotate about a rotation axis Z with respect to the seat base 604. In other example embodiments, the seat shell 602 can be fixedly coupled to the seat base 604 and can rotate about a rotation axis Z with respect to the seat base 604.

The seat shell 602 of the rotatable child car seat 600 can be made of any material including, but not limited to, plastic, metal, composite, or a combination thereof. In one example embodiment, all or a portion of the seat shell 602 can be formed of a molded plastic and can include a front side, for receiving a child therein, and an opposing rear side. The front side of the seat shell 602 can include a seat back 610 or backrest and a seat bottom 608, upon which a child can sit. The seat shell 602 can also include a pair of side retaining walls 612 extending forward from the seat back 610 and/or up from the seat bottom 608 at or adjacent to the opposing, vertically-extending lateral sides of the seat back 610 and/or seat bottom 608. In one example, the side retaining walls 612 are configured to limit side-to-side movement of the child while in the rotatable child car seat 600 and can be integrally formed with the seat shell 602 or coupled to a portion of the seat back 610 and/or seat bottom 608. All or a portion of the seat shell 602 can be covered in padding and/or soft goods (e.g., padding, fabric, leather, faux leather, and/or another material) to increase the comfort level of sitting in the car seat 600.

The rotatable child car safety seat 600 can also include a pair of armrests 609. Each armrest 609 can be positioned above the top surface 129 of the seat bottom 608. For example, each armrest 609 can be coupled to or integrally formed with the seat shell 602 of the car seat 600 along opposing lateral sides of the seat bottom 608. The rotatable child car seat 600 can also include at least one cupholder 640. The cupholder 640 can be coupled to the armrest 609 and/or the seat bottom 608. In certain example embodiments, the cupholder 640 can be removable from the seat shell 602. In other example embodiments, the cupholder 640 can be rotatable with respect to the seat shell 602.

The rotatable child car seat 600 can also include a child restraint system (not shown). The child restraint system can include at least a pair of shoulder straps or belts. Each of the shoulder belts can include a first end and a distal second end. The first end of each shoulder belt can be removably coupled directly or indirectly to the seat shell 602 of the car seat 600. In one example embodiment, each first end of each shoulder belt may be threaded through or otherwise slidably attached and adjustable along a chest harness (not shown). The chest harness can be removably coupled to a chest harness clip (not shown). In one example, the chest harness can include a latch plate (not shown) that is configured to be removably coupled to the chest harness clip. For example, the chest harness clip can be coupled directly or indirectly to the seat shell and can include a latch (not shown) having a release mechanism. The latch can be configured to receive the latch plate and couple the chest harness to the chest harness clip. The release mechanism is configured to disengage the chest harness from the chest harness clip by, for example, releasing the latch plate from the latch.

The second end of each the shoulder belts can be coupled to one end of a strap tensioning mechanism that is positioned along the rear side 613 of the seat back 610 of the seat shell 602. For example, each shoulder belt can be fed through one of multiple harness slots (not shown) in a seat back 610 of the seat shell 602. Each harness slot can define a passageway from the front side 611 to the rear side 613 of the seat back 610 of the seat shell 602. In one example, the multiple harness slots can be paired (such that each receives one of the at least two shoulder belts) and oriented vertically along the seat back 610 of the seat shell 602 to provide a vertical positioning adjustment for the shoulder belts as they pass from the front side 611 of the seat back 610 to the rear side 613 of the seat back 610. In one example, four pairs of harness slots are oriented vertically along the seat back 610 of the seat shell 602. However, greater or fewer numbers of harness slots can be provided along the seat back 610.

As best seen in FIGS. 6A-D and 6G, the seat base 604 can include a bottom surface 618, an opposing top surface 624, and one or more side walls 621 that extend substantially vertically upward from the bottom surface 618 to the top surface 624 of the seat base 604. The seat base 604 can also include a front-facing end 620, an opposing rear-facing end 622, a first lateral side 617, and an opposing second lateral side 619. In one example, when the seat base 604 of the rotatable child car safety seat 600 is placed on the top surface of a seat bottom 698 of an automobile seat, the rear-facing end 622 of the seat base 604 will be positioned adjacent to and may abut the seat back 699 of the automobile seat and the front facing end 620 of the seat base 604 will be positioned near the front edge of the seat bottom 698 of the automobile.

The seat base 604 can also include a seat shell rotation axle 626 coupled to or integrally formed with the seat base 604 and extending vertically or substantially vertically upward from the top surface 624 of the seat base 604. In one example embodiment, the rotation axle 626 can be cylindrically or substantially cylindrically shaped and can be constructed of metal, plastic, or any other material. In other embodiments, the rotation axle 626 can have any other shape known to those of ordinary skill in the art. The rotation axle 626 can define the rotation axis Z about which the seat shell 602 rotates with respect to the seat base 604. In the example embodiment of FIGS. 6A-G, the rotation axle 626 is not centered along the longitudinal axis L of the seat base 604. Instead, the rotation axle 626 is positioned substantially adjacent to the front-facing end 620 of the seat base 604. For example, the rotation axle 626 can be positioned closer to the front-facing end 620 than the center of the longitudinal axis L of the seat base 604. In one example embodiment, the rotation axle 626 is positioned within two inches of the front-facing end 620 of the seat base 604.

Repositioning the rotation axle 626 and accordingly the rotation axis Z away from the center of the longitudinal axis of the seat base 604 and to a spot adjacent the front-facing end 620 of the seat base 604 changes the rotation characteristics of the seat shell 602 with respect to the seat base 604. First of all, when the car safety seat 600 is in a rear-facing orientation, where the child in the seat 600 faces the seat back 699 of the automobile seat, moving the rotation axle 626 towards the front-facing end 620 of the seat base 604 allows the point of rotation of the seat shell 602 to also be moved from a generally central position of the seat shell 602 to farther away from a front end 635 of the seat bottom 608 and adjacent to the seat back 610 of the seat shell 602.

Figure 8A:
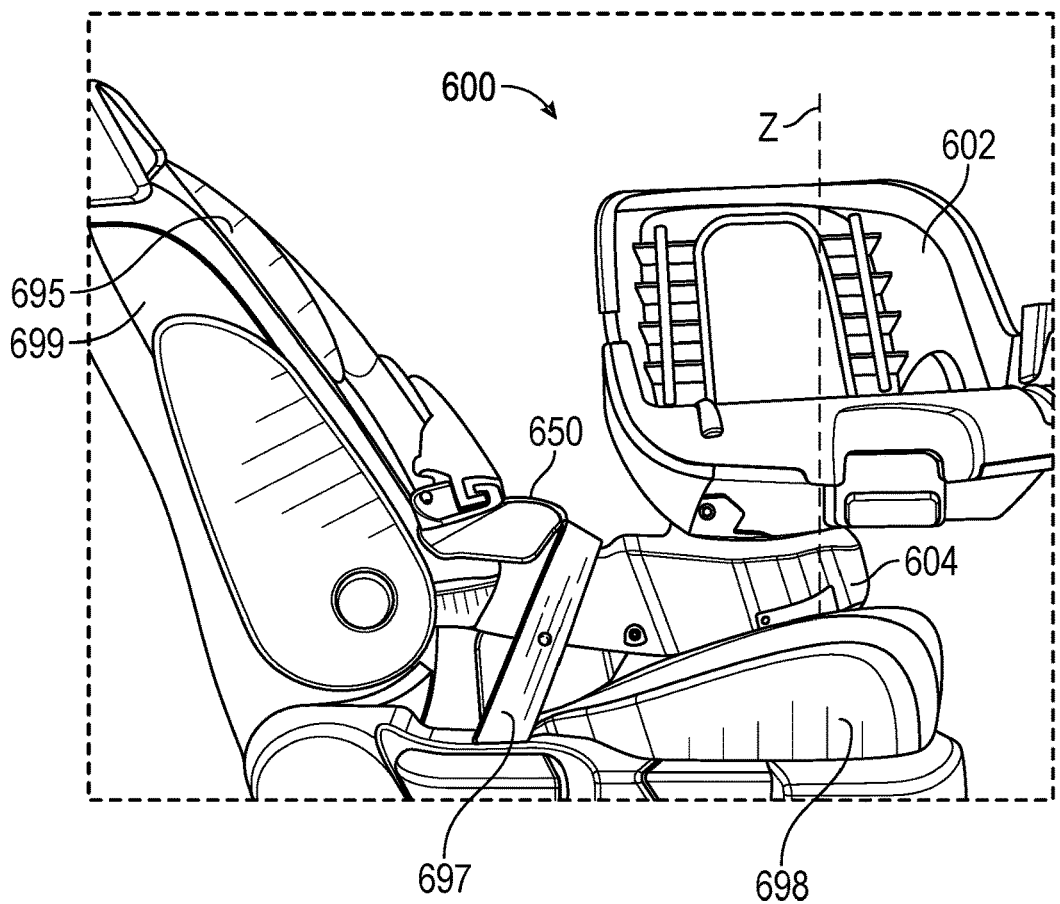
FIG. 8A is a side elevation view of the rotatable child car seat of FIGS. 6A-G with the seat shell rotated to a load/unload position in accordance with one example embodiment of the disclosure.

By moving the point of rotation for the seat shell 602 farther back towards the seat back 602 it creates at least two advantageous aspects for the rotatable child car safety seat 600. First, as shown in FIG. 8A, when the point of rotation and the rotation axis Z for the set shell 602 is moved towards the seat back 610, as described below, when the seat shell 602 rotates from a use position to a load/unload position (as shown in FIG. 8A), the front portion of the seat shell clears and provides access from a top side to the back half of the seat base 604 from the rear-facing end 622 to about the mid-point of the longitudinal axis L for the seat base 604. This open access from above the seat base 604 to the rear half of the seat base 604 allows for the addition of a seat belt lock-off system to the seat base 604, as described below.

Figure 8B:
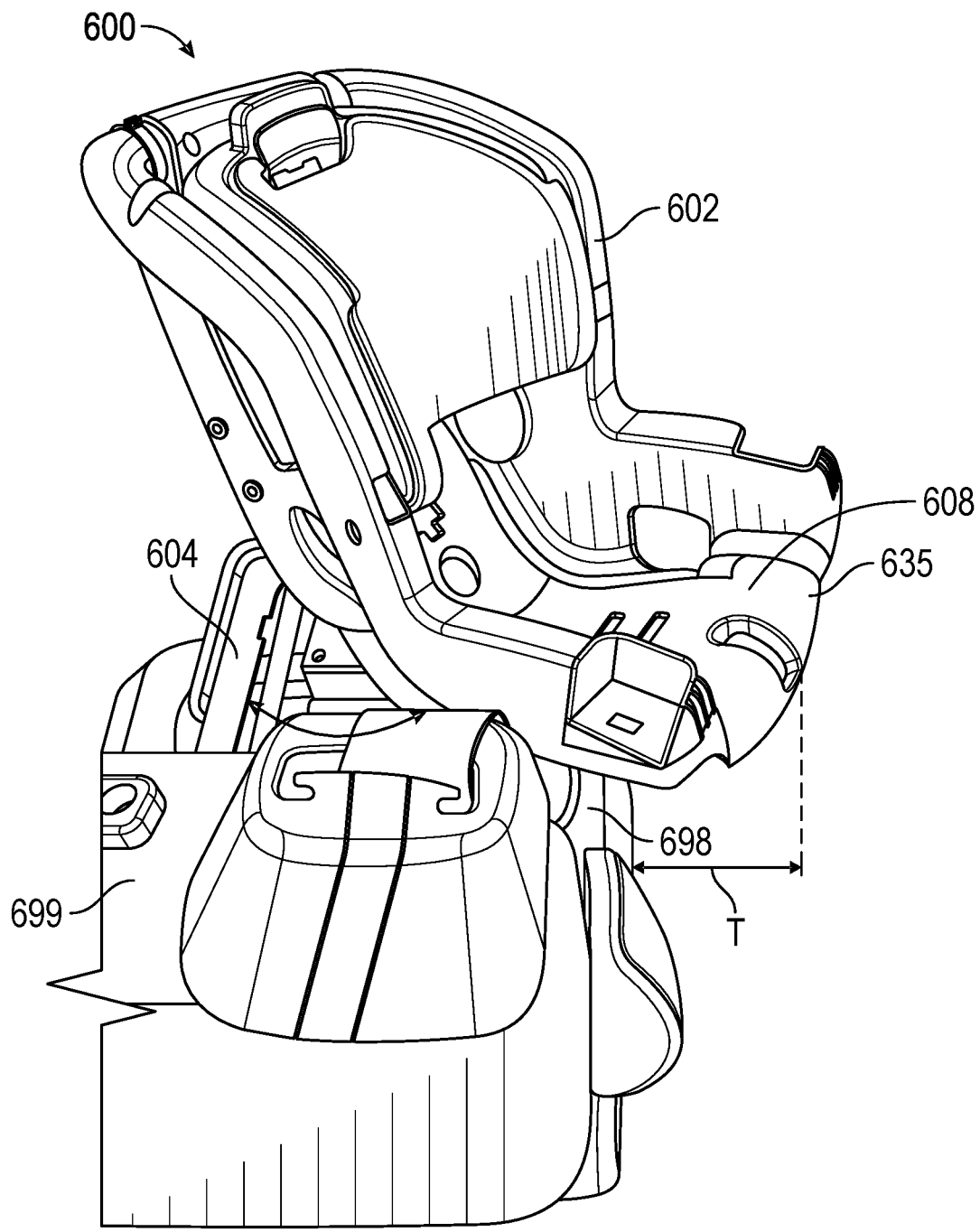
FIG. 8B is a perspective view of the rotatable child car seat of FIGS. 6A-G with the seat shell being rotated to the load/unload position in accordance with one example embodiment of the disclosure.
Figure 8C:
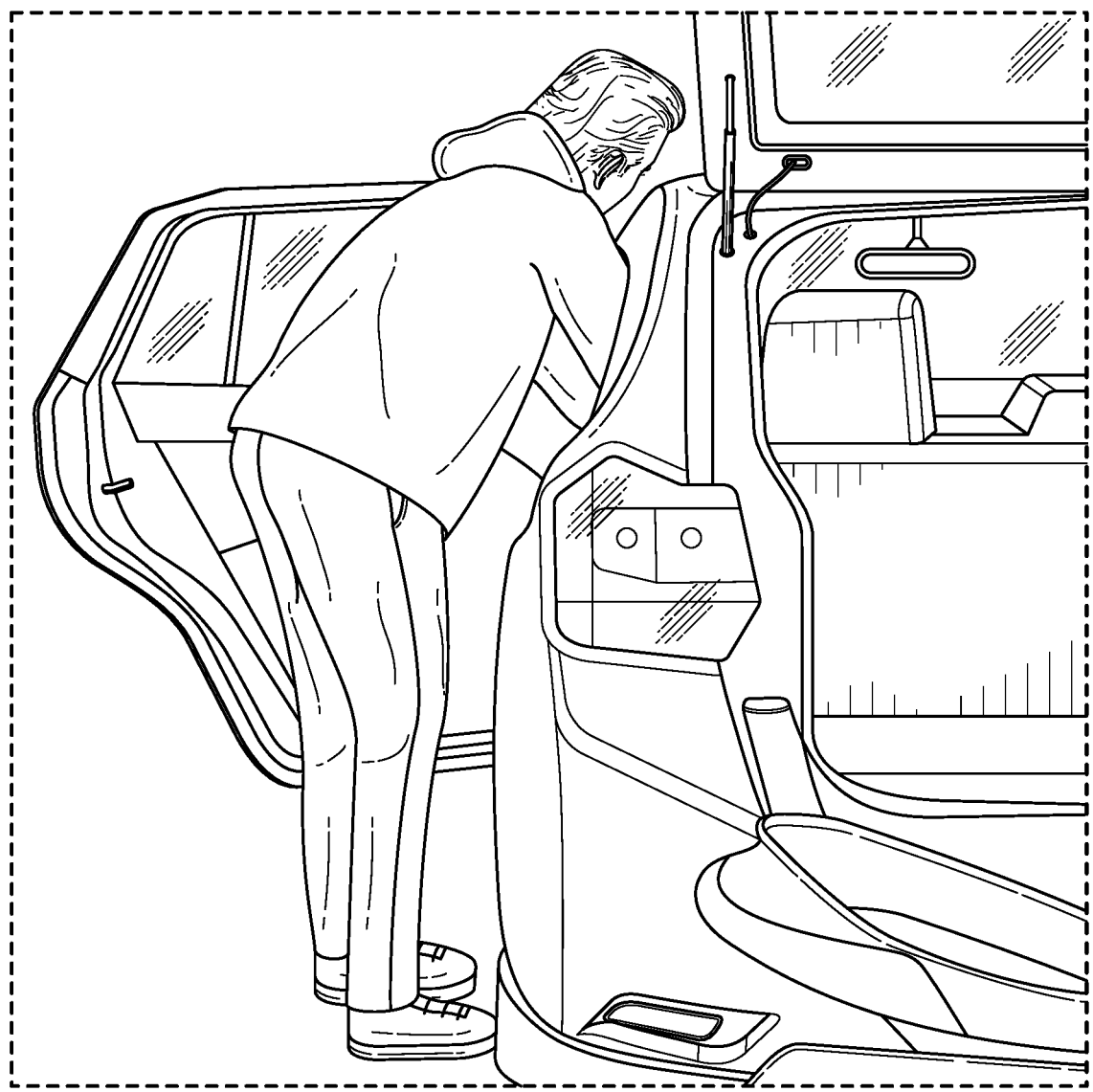
FIG. 8C is an illustrative view of a parent/caregiver loading/unloading a child into the child car seat of FIGS. 6A-G in accordance with one example embodiment of the disclosure.

The second advantage of moving the point of rotation for the seat shell 602 towards the seat back 610 is noticeable when the child safety seat 600 is in a rear-facing configuration and the seat shell 602 is rotated with respect to the seat base 604 from the use position (as shown in FIG. 6A) to a load/unload position (as shown in FIGS. 8A and 8B). As shown in FIG. 8B, when the seat shell 602 is rotated to the load/unload position, the front end 635 extends out from the first lateral side 617 of the seat base 604 a significant distance and when the seat 600 is positioned adjacent an end of the automobile seat, the front end 635 of the seat bottom 608 extends beyond the lateral edge of the seat bottom 698 of the automobile by a distance T. This extension of the front end 635 of the seat bottom 698 beyond the lateral edge of the seat bottom 698 of the automobile and towards a door (not shown) of the automobile, makes it easier for a parent/caregiver to remove and place child within the seat shell 602 of the car seat 600. As shown in FIG. 8C. the parent/caregiver is able to remove and/or place a child into the car seat 600 when the seat shell 602 is rotated into the load/unload position while keeping their head outside of the automobile and maintaining a better posture. This is because the front edge 635 of the seat bottom 608 is effectively moved towards the parent/caregiver as it extends beyond the lateral edge of the seat bottom 698 of the automobile the distance T.

Returning to FIGS. 6A-G, the seat base 604 can also include a rotation stop tab 658 (FIG. 8C). In one example, the rotation stop tab 658 can be positioned adjacent the rotation axle 626 and can extend vertically or substantially vertically upward from the top surface 624 of the seat base 604. The rotation stop tab 658 can be configured to be inserted into a rotation slot 664 along the bottom or back side of the seat shell 602 and described in greater detail below. The rotation stop tab 658 can have any shape (e.g., cylindrical, cubed, cuboid, spherical, or any combination thereof) and can be made from metal, plastic, or any other material. In one example embodiment, each of the rotation axle 626 and the rotation stop tab 658 are positioned on and extend vertically or substantially vertically up from a raised platform 657 extending up from the top surface 624 of the seat base 604.

The seat base 604 can also include a rotation track 628. In one example, the rotation track extends vertically or substantially vertically up from the top surface 624 of the seat base 602. In other example embodiments, the rotation track 628 can extend vertically or substantially vertically down from the top surface 624 of the seat base 602 to create an inlaid track or elongated slot. In certain example embodiments, the rotation track 628 is an arcuate track. The arcuate rotation track 628 can have a constant or substantially constant radius and can extend for between 45-270 degrees and more preferably can extend for between 160-230 degrees. A track wheel 660, roller, or thrust bearing on the seat shell 602 can be configured to ride, roll, and/or slide along the top surface of the rotation track 628 to reduce friction as the seat shell 602 rotates with respect to the seat base 604 about the rotation axis Z.

The seat base 604 can also include a first seat locking hub 630 and a second seat locking hub 632. Each of the first seat locking hub 630 and the second seat locking hub 632 can be positioned along the top surface 624 of the seat base 604 and adjacent the rear-facing end 622 of the seat base 604, in certain example embodiments. The seat locking hubs 630, 632 can take any form and can be configured to help maintain the seat shell 602 in the use position absent manual manipulation by a parent/caregiver.

In one example, the first seat locking hub 630 can include a first channel 634. The first channel 634 can be a slot, track, or opening through at least a portion of the first seat locking hub 630 and can be straight or arcuate. The first channel 634 can be configured to allow a first portion 692 of a seat locking member 670, 672 to pass through the first channel 634. In one example, the first channel 634 extends generally in a direction generally orthogonal to the longitudinal axis L of the seat base 604. The first seat locking hub 630 can also include a first seat retaining member 636. The first seat retaining member 636 can be disposed along one lateral side of the first channel 634. The first seat retaining member 636 can take any shape. In certain examples, the first seat retaining member 636 is L-shaped, substantially L-shaped, J-shaped, substantially J-shaped, or shaped into the form of a hook. For example, each first seat retaining member 636 can include a first portion 688 that extends vertically or substantially vertically up from a base surface of the first seat locking hub 630 and/or the top surface 624. The first seat retaining member 636 can also include a second portion 690 that extends from the first portion 688 in a direction orthogonal or substantially orthogonal to the longitudinal axis of the vertically-extending first portion 688. Between the bottom surface of the second portion 690 of the first seat retaining member 636 and the base surface of the first seat locking hub 630 and/or the top surface 624, the first seat retaining member 636 can also include a second channel 638. The second channel 638 can be configured to allow a second portion 694 of the seat locking member 670, 672 to pass through the second channel 638. In certain example embodiments, the first channel 634 and the second channel 638 extend along parallel paths through the first seat locking hub 630. The first seat locking hub 630 can also include one or more inner walls 680 and one or more outer walls 681 that extend vertically or generally up from the top surface 624 of the seat base 604. In one example, each of the first channel 634 and the second channel 638 can extend from the outer wall 681 to the inner wall 680 of the first seat locking hub 630.

In one example, the second seat locking hub 632 can include a first channel 640. The first channel 640 can be a slot, track, or opening through at least a portion of the second seat locking hub 632 and can be straight or arcuate. The first channel 640 can be configured to allow a first portion 692 of a seat locking member 670, 672 to pass through the first channel 640. In one example, the first channel 640 extends in a direction generally orthogonal to the longitudinal axis L of the seat base 604. The second seat locking hub 632 can also include a second seat retaining member 642. The second seat retaining member 642 can be disposed along one lateral side of the first channel 640. The second seat retaining member 642 can take any shape. In certain examples, the second seat retaining member 642 is L-shaped, substantially L-shaped, J-shaped, substantially J-shaped, or shaped into the form of a hook. For example, each second seat retaining member 642 can include a first portion 688 that extends vertically or substantially vertically up from a base surface of the second seat locking hub 632 and/or the top surface 624. The second seat retaining member 642 can also include a second portion 690 that extends from a top end of the first portion 688 in a direction orthogonal or substantially orthogonal to the longitudinal axis of the vertically-extending first portion 688. Between the bottom surface of the second portion 690 of the second seat retaining member 642 and the base surface of the second seat locking hub 632 and/or the top surface 624, the second seat retaining member 636 can also include a second channel 644. The second channel 644 can be configured to allow a second portion 694 of the seat locking member 670, 672 to pass through the second channel 644. In certain example embodiments, the first channel 640 and the second channel 644 extend along parallel paths through the second seat locking hub 632. The second seat locking hub 632 can also include one or more inner walls 678 and one or more outer walls 679 that extend vertically or generally up from the top surface 624 of the seat base 604. In one example, each of the first channel 640 and the second channel 644 can extend from the outer wall 679 to the inner wall 678 of the second seat locking hub 632.

The seat base 604 can also include a seat belt lock-off system. As best seen in FIGS. 6B and 6D. the seat belt lock off system can include a lock-off latch arm 650 and a lock-off latch (not shown). The lock-off latch arm 650 is configured to be removably coupled to the lock-off latch. The lock-off latch arm 650 can be coupled to and rotatable/pivotable with respect to the seat base 604. In one example, the lock-off latch arm 650 can be coupled to and rotatable/pivotable with respect to the seat base 604 via a hinge or other rotating means positioned along a first end 652 of the lock-off latch arm 650. The lock-off latch arm 650 can be configured to rotate/pivot with respect to the seat base 604 about a horizontal or substantially horizontal axis from a locked position (in which the lock-off latch arm 650 engages and is coupled to the lock-off latch) to an unlocked position. In the locked position, the lock-off latch arm 650 being coupled to the lock-off latch, prevents the automobile seat belt tether for the automobile seat the child car safety seat 600 is positioned upon from being detached form the seat 600 and from being removed from between the lock-off latch arm 650 and the seat base 604.

The lock-off latch arm 650 can also include a latch release mechanism 654 positioned along a second end 654 of the lock-off latch arm 650. The latch release mechanism 654 can be any form or release mechanism including, but not limited to, a lift-tab, a push-button, a pull-tab, twist-knob, etc. The lock-off latch arm 650 can be configured to rotate along the arc A from a latched (as shown in FIG. 6B) to an unlatched (as shown in FIG. 6D) position and from an unlatched to a latched position. In certain example embodiments, the lock-off latch arm 650 can include a tension member (not shown) that along an inner surface 651 of the arm 650. In one example, the tension member 651 can extend along at least a portion of the longitudinal axis of the lock-off latch arm and can be configured to apply additional tension to one or more automobile seat belt tethers 695, 697 contained within the seat belt lock-off system.

The seat belt lock-off system can also include a first automobile seat belt tether positioning surface 646 and a second automobile seat belt tether positioning surface 648. Each automobile seat belt tether positioning surface 646, 648 can be provided along the top surface 624 of the seat base and can have a smooth or substantially smooth top surface to allow the tether to slide along with minimal friction. The first automobile seat belt tether positioning surface 646 can be positioned adjacent and/or along side a first lateral side of the lock-off latch arm mechanism. 650 and can extend toward and/or to the second lateral side 619 of the seat base 604. As such, the first automobile seat belt tether positioning surface 646 can be described as being between the lock-off latch arm 650 and the second lateral side 619 of the seat base 604, in one example embodiment. The second automobile seat belt tether positioning surface 648 can be positioned adjacent and/or along side a second lateral side of the lock-off latch arm mechanism. 650 opposite the first lateral side and can extend toward and/or to the first lateral side 617 of the seat base 604. As such, the second automobile seat belt tether positioning surface 648 can be described as being between the lock-off latch arm 650 and the first lateral side 617 of the seat base 604, in one example embodiment. Each automobile seat belt tether positioning surface 646, 648 can be a convex and/or curved from a high point adjacent the lock-off latch arm 650 to a low point along the respective lateral side 619, 617 of the seat base 604, in certain example embodiments.

The seat belt lock-off system can also include a latch arm receiving cavity 656. In one example, the latch arm receiving cavity 656 can be located between the first automobile seat belt tether positioning surface 646 and the second automobile seat belt tether positioning surface 648. The latch arm receiving cavity 656 can extend downwardly from the top surface 624 of the seat base 604 and can be configured to receive at least a portion of the lock-off latch arm 650 when the arm 650 is in the latched position (as shown in FIG. 6B). In certain example embodiments, the lock-off latch (now shown) can be positioned within the latch arm receiving cavity 656.

In one example of the operation of the seat belt lock off system, the latch plate of a three-point automobile seat belt can be buckled to the buckle between the seat bottom 698 and seat back 699. The lock-off latch arm 650 can be released from the lock-off latch and rotated along the arc A from the latch to the unlatched position. A portion of waist tether 697 and the shoulder tether 695 can be placed along the first automobile seat belt tether positioning system 646 and the second automobile seat belt tether positioning system 648 so as to extend across the latch arm receiving cavity 656. The lock-off latch arm 650 can be rotated along the arc A towards the latch arm receiving cavity 656 from the unlatched to the latched position. If the lock-off latch arm 650 includes a tensioning member, as the lock-off latch arm 650 and tensioning member enter the cavity 656 the tensioning member will apply a downward force on the waist tether 697 and the shoulder tether 695 to increase the tension in both tethers 695, 697. The lock-off latch arm 650 can be further rotated along the arc A until the lock-off latch arm 650 is coupled to the lock-off latch, which prevents the tethers 695, 697 from being removed from the seat base 604.

As best seen in FIGS. 6E-G, the seat shell 602 can further include an axle aperture 662 that is configured to receive at least a portion of the rotation axle therein to rotatably couple the seat shell 602 to the seat base 604. As discussed above, rotation axle defines the axis of rotation Z for the seat shell 602 with respect to the seat base 604. In certain example embodiments, the axle aperture 662 if positioned along a bottom end of the seat back 110 near where the seat bottom 608 meets the seat back 610. As discussed above, by moving the axle aperture 662 away from a generally central position of the seat shell 602 to farther away from a front end 635 of the seat bottom 608 and towards and/or adjacent to the seat back 610 of the seat shell 602, it changes the point of rotation for the seat shell 602 about the rotation axis Z such that, when the seat shell 602 rotates from a use position to a load/unload position (as shown in FIG. 8A), the front portion of the seat shell 602 clears and provides access from a top side to the back half of the seat base 604 the front end 635 extends out from the first lateral side 617 of the seat base 604 a significant distance T beyond the lateral edge of the seat bottom 698 of the automobile. In one example embodiment, the rotation axle 626 can be slidably inserted into the axle aperture 662 with the axle aperture 662 having a slightly larger diameter than the diameter of the rotation axle 626. While not shown, the axle aperture 662 can include mechanisms from gripping and or holding the rotation axle 626 within the axle aperture 662 and to maintain a proper orientation between the rotation axle 626 and the seat shell 602.

The seat shell 602 can also include a rotation slot 664. In certain examples, the rotation slot 664 can be position adjacent and/or about at least a portion of the axle aperture 662. For example, the rotation slot 664 can be positioned axially about at least a portion of the axle aperture 662. In this example, the rotation slot 664 can having partially concentric inner and outer walls at different radii from the axle aperture 662 to define an opening that makes up the rotation slot 664 and is configured to receive the rotation stop tab 658 on the seat base 604. The rotation slot 664 can include a first rotation stop 666 and a distal second rotation stop 668. In one example, first rotation stop 666 is a first end wall of the rotation slot 664 and the second rotation stop 668 is a second end wall of the rotation slot 664. The first 666 and second 668 rotation stops define the limits of rotation for the seat shell 602 with respect to the seat base 604. For example, as the seat shell 602 rotates with respect to the seat base 604, the rotation stop tab 658 moves within the rotation slot 664. Rotation of the seat shell 602 with respect to the seat base 604 is stopped or prevented when the rotation stop tab 658 contacts the first rotation stop 666 or the second rotation stop 668. In certain example embodiments, the seat shell 602 can rotate in a range of 75-270 degrees with respect to the seat base 604 and more preferably in a range of 90-240 degrees and even more preferably in a range of 170-220 degrees.

While the example embodiments of FIGS. 6A-G show and describe the rotation axle 626 on the seat base 604 and the axle aperture 662 on the seat shell 602, in other example embodiments, the positioning of each could be switched such that the rotational axle 626 is on the seat shell 602 in substantially the same position as that shown of the axle aperture 662, and the axle aperture 662 is on the seat base 604 in substantially the same position as that shown for the rotational axle 626. In a similar manner, while the example embodiments of FIGS. 6A-G show and describe the rotation stop 658 on the seat base 604 and the rotation slot 664 on the seat shell 602, in other example embodiments, the positioning of each could be switched such that the rotation stop 658 is on the seat shell 602 near the location shown for the rotation slot 664, and the rotation slot 664 can be on the seat base 604 near the location shown for the rotational stop 658.

The seat shell 602 can also include a track wheel 660 or other rolling/sliding device (e.g., roller, bearing, or thrust bearing). The track wheel 660 can be coupled to the seat shell 602 and can be positioned along a bottom side 633 of the seat shell 602 adjacent the bottom end of the seat back 110. At least a portion of the track wheel can rotate with respect to the seat shell 602 in certain example embodiments. The track wheel 660 can be configured to ride, roll, and/or slide along the top surface of the rotation track 628 to reduce friction as the seat shell 602 rotates with respect to the seat base 604 about the rotation axis Z.

The seat shell 602 can also include a first seat locking member 670 and a second seat locking member 672. In one example, the first seat locking member 670 and the second seat locking member 672 can be positioned along the front end 635 of the seat bottom 608 and can extend in a generally downward direction from the bottom side 633 of the seat base 602. The first seat locking member 670 can be disposed along one lateral side 684 of a rotation release actuator 674. The first seat locking member 670 can take any shape. In certain examples, the first seat locking member 670 is L-shaped, substantially L-shaped, J-shaped, substantially J-shaped, or shaped into the form of a hook. For example, each first seat locking member 670 can include a first portion 692 that extends vertically or substantially vertically down from a bottom side 633 of the seat shell 602. The first seat locking member 670 can also include a second portion 694 that extends from the first portion 692 in a direction orthogonal or substantially orthogonal to the longitudinal axis of the vertically-extending first portion 692. The first portion 692 is configured to pass through the first channels 634, 640 of the first seat locking hub 630 and the second seat locking hub 632 as the seat shell 602 is rotated about the rotation axis Z with respect to the seat base 604. The second portion 694 is configured to pass through the second channels 638, 644 of the first seat locking hub 630 and the second seat locking hub 632 as the seat shell 602 is rotated about the rotation axis Z with respect to the seat base 604.

The second seat locking member 672 can be disposed along a second lateral side 682 of a rotation release actuator 674 opposite the first lateral side 684. The second seat locking member 672 can take any shape. In certain examples, the second seat locking member 672 is L-shaped, substantially L-shaped, J-shaped, substantially J-shaped, or shaped into the form of a hook. For example, each second seat locking member 672 can include a first portion 692 that extends vertically or substantially vertically down from a bottom side 633 of the seat shell 602. The second seat locking member 672 can also include a second portion 694 that extends from the first portion 692 in a direction orthogonal or substantially orthogonal to the longitudinal axis of the vertically-extending first portion 692. The first portion 692 is configured to pass through the first channels 634, 640 of the first seat locking hub 630 and the second seat locking hub 632 as the seat shell 602 is rotated about the rotation axis Z with respect to the seat base 604. The second portion 694 is configured to pass through the second channels 638, 644 of the first seat locking hub 630 and the second seat locking hub 632 as the seat shell 602 is rotated about the rotation axis Z with respect to the seat base 604.

The seat shell 602 can also include a rotation release actuator 674. In one example, the rotation release actuator 674 can be positioned along the front side 635 of the seat bottom 608. While the example embodiment of FIGS. 6A-6G present the rotation release actuator 674 as a handle, in other example embodiments it can be a switch, rotating knob, push-button, pull-lever or any other known form of actuator to release the seat shell 602 with respect to the seat base 604 so that the seat shell 602 can rotate about the rotation axis Z.

In one example, the rotation release actuator 674 includes a first lateral side 684, a second lateral side 682 opposite the first lateral side 684, a bottom edge 686 that can extend from the first lateral side 684 to the second lateral side 682 and a gripping handle or gripping recess disposed between the first lateral side 684 and the second lateral side 682. The rotation release actuator 674 can also include a hinge 676. The hinge 676 can be positioned along a back end of the rotation release actuator 674. The hinge 676 can be coupled to one or more pivot pins that can also couple the rotation release actuator 674 to the bottom side 633 of the seat shell 602. The hinge 676 and the one or more pivot pins can also define an axis of rotation for the rotation release actuator 674.

The rotation release actuator 674 may be movable in the vertical directions A-B by rotating about the hinge 676 and one or more pivot pins. In certain example embodiments, the rotation release actuator can also include a spring or other biasing means that spring biases the rotation release actuator 674 downward in the direction B. When a parent/caregiver wants to unlock the seat shell 602 from the seat base 604 for rotation, the parent/caregiver can apply an upward force in the direction A to the gripping handle or gripping recess of the rotation release actuator 674 that is greater than the spring biasing force on the rotation release actuator 674. This force will move the rotation release actuator 674 in the upward direction B. The rotation release actuator 674 will be pulled/pushed upward in the direction B until the bottom edge 686, first lateral side 684, and second lateral side 682 of the rotation release actuator 674 are above the top end of the first seat locking hub 630 and/or second seat locking hub 632 (depending on which direction the seat shell 602 is to be rotated). Once the bottom edge 686, first lateral side 684, and second lateral side 682 of the rotation release actuator 674 are above the top end of the first seat locking hub 630 and/or second seat locking hub 632, the seat shell 602 can be rotated with respect to the seat base about the rotation axis Z without the first lateral side 684 contacting the inner wall 680 of the first seat locking hub 630 (thus preventing rotation) or the second lateral side 682 contacting the inner wall 678 of the second seat locking hub 632 (thus preventing rotation).

Figure 7A:
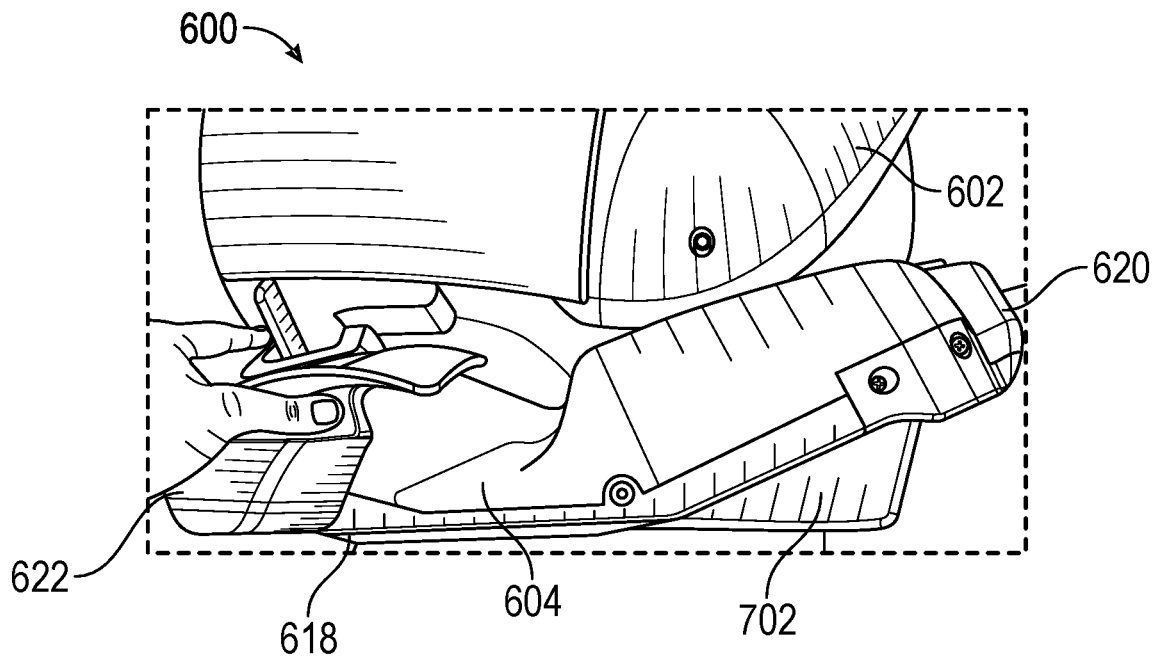
FIGS. 7A-C are various views of a rotatable recline foot for adjusting the recline angle of the rotatable child car seat of FIGS. 6A-G in accordance with one example embodiment of the disclosure.
Figure 7B:
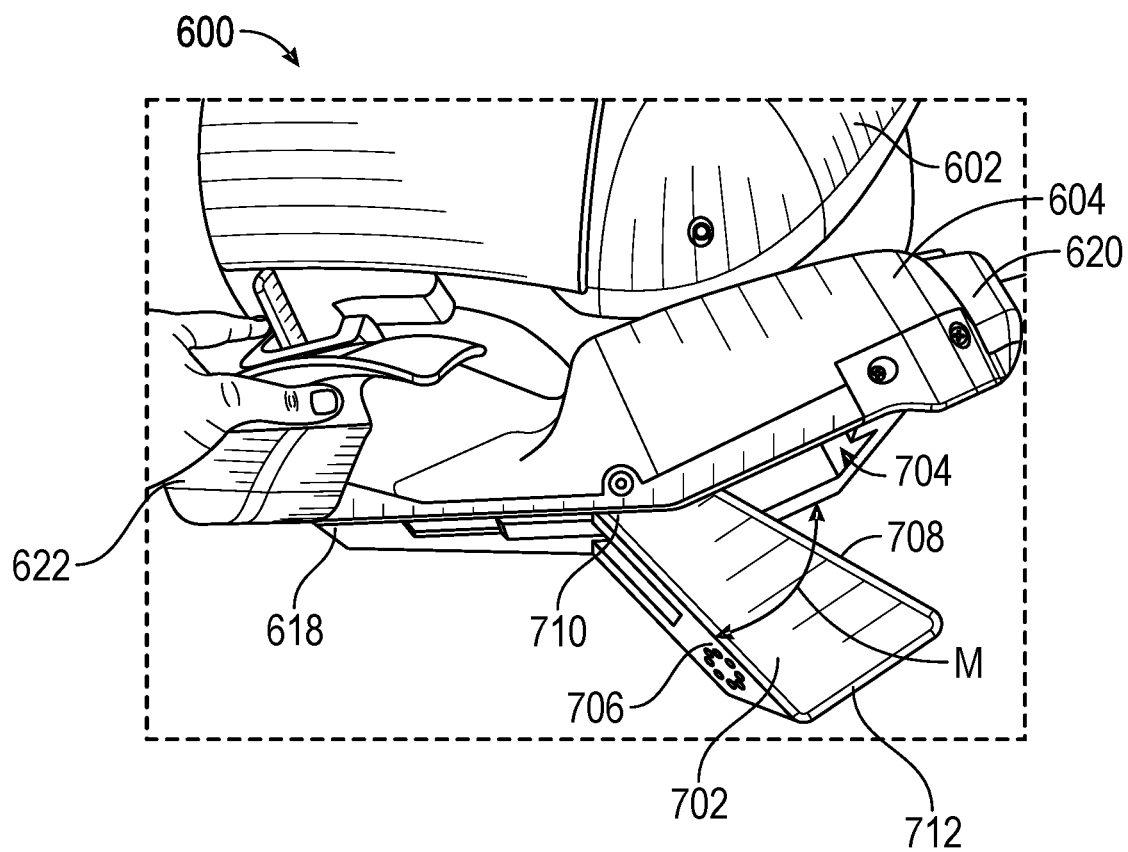
Figure 7C:
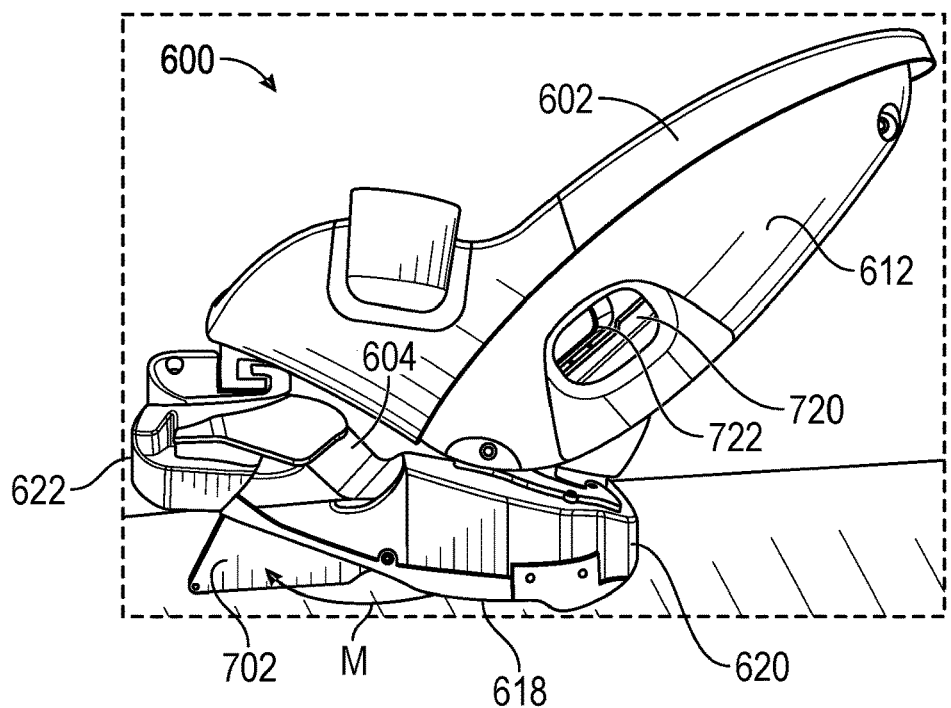

FIGS. 7A-C are various views of a rotatable recline foot member 702 (hereinafter "recline foot" or "rotatable recline foot") for adjusting the recline angle of the rotatable child car seat 600 of FIGS. 6A-G in accordance with one example embodiment of the disclosure. Referring now to FIGS. 6A-7C, the rotatable child car seat 600 can also include a rotatable recline foot 702 coupled to and rotatable with respect to the seat base 604. In one example, the rotatable recline foot 702 can be used by a parent/caregiver when the rotatable child car seat 600 is placed in a forward-facing orientation, as shown in FIG. 7C. In the forward-facing orientation, the seat base 604 and seat shell 602 are reversed 180 degrees from their setup in the rear-facing orientation of FIG. 6A, such that when the seat base 604 of the rotatable child car safety seat 600 is placed on the top surface of a seat bottom 698 of an automobile seat, the front-facing end 620 of the seat base 604 will now be positioned adjacent to and may abut the seat back 699 of the automobile seat and the rear-facing end 622 of the seat base 604 will now be positioned near the front edge of the seat bottom 698 of the automobile. Similarly, in the forward facing orientation and when the seat shell 602 is in the use position, the seat back 610 of the seat shell 602 will be positioned adjacent to and may abut the seat back 699 of the automobile and the front end 635 of the seat bottom 608 will be positioned near the front edge of the seat bottom 698 of the automobile.

In certain situations, it may be beneficial to tilt the seat shell 602 backwards towards the seat back 699 of the automobile when the rotatable child car seat 600 is in the forward-facing orientation, such as when the child being placed into the seat 600 is smaller but still of sufficient size and age to be forward-facing in the car seat 600. The rotatable recline foot 702 can provide an easy and efficient mechanism for reclining or removing the recline on the child car safety seat 600. In one example, the rotatable recline foot 702 can be adjustable from a level position (as shown in FIG. 7A) to a recline position (as shown in FIG. 7C) by rotating the recline foot 702 in the direction M with respect to the seat base 604.

The recline foot 702 can include a first bottom surface 706 along a first side of the recline foot 702 and a second bottom surface 708 provided along a second side of the recline foot 702 opposite the first side. The recline foot 702 can also include an inner side wall 710 and an outer side wall 712 opposite the inner side wall. In certain example embodiments, the height of the outer side wall 712 is greater than the height of the inner side wall 710. The first bottom surface 706 can extend from the inner side wall 710 to the outer side wall 712 and the second bottom surface 708 can also extend from the inner side wall 710 to the outer side wall 712. In certain examples, when the recline foot 702 is in the level position, the first bottom surface 706 faces and abuts the seat bottom 698 of the automobile and the second bottom surface 708 acts as a top surface of the recline foot 702. Conversely, when the recline foot 702 is in the recline position, the second bottom surface 708 faces and abuts the seat bottom 698 of the automobile and the first bottom surface 706 acts as a top surface of the recline foot 702.

The recline foot 702 can extend substantially from the first lateral side 617 to the second lateral side 619 of the seat base 604, in certain example embodiments. The recline foot 702 can be coupled to the seat base 604 with one or more pins, bolts, or other coupling devices along inner side wall 710 and the coupling devices can define an axis of rotation about which the recline foot 702 rotates with respect to the seat base 604 along the bottom surface 618 of the seat base 604. In certain example embodiments, a single coupling device may be used that extends from the first lateral side 617 to the second lateral side 619 of the seat base 604. In other examples, a first coupling device can be provided along the first lateral side 617 and a second coupling device can be provided along the second lateral side 619, with the first and second coupling devices being collinear or substantially collinear along their longitudinal axes and the recline foot 702 can rotate about both the first and second coupling devices.

In one example embodiment, the first bottom surface 706 can be a flat or substantially flat surface from the inner side wall 710 to the outer side wall 712. In other example embodiments, only the outer perimeter of the first bottom surface 706 may be flat or substantially flat with the other portion including a cavity into the first bottom surface 706 and/or an aperture through the recline foot from the first bottom surface 706 to the second bottom surface 708 to reduce the weight of the recline foot 702. In one example embodiment, the second bottom surface 708 can be a flat or substantially flat surface from the inner side wall 710 to the outer side wall 712. In other example embodiments, only the outer perimeter of the second bottom surface 708 may be flat or substantially flat with the other portion including a cavity into the second bottom surface 708 and/or an aperture through the recline foot 702 from the second bottom surface 708 to the first bottom surface 706 to reduce the weight of the recline foot 702.

In certain example embodiments, the second bottom surface 708 can be disposed at an angle greater than zero to the first bottom surface 706. For example, the second bottom surface 708 can be disposed at an acute angle to the first bottom surface 706. The rotatable child car safety seat 600 can also include a cavity or void 704 provided along the bottom surface 618 of the seat base 604. The cavity 704 can be positioned adjacent the rear-facing end 620 of the seat base 604 and can extend along the bottom of the seat base 604 from substantially the first lateral side 617 to substantially the second lateral side 619. The cavity 704 can be configured to receive therein at least a portion of the recline foot 702 when the recline foot 702 is in the level position.

As best seen in FIG. 7C, the seat shell 602 of the rotatable child car safety seat 600 can also include a first seat belt aperture 720 disposed along the first side retaining wall 612 and a second seat belt aperture 722 disposed along the second side retaining wall 612. In the front-facing orientation, the automobile seat belts 695, 697 are routed through the first seat belt aperture 720 and the second seat belt aperture 722 prior to buckling the automobile seat belts 695, 697 to a buckle of the automobile. Thus, in the front-facing orientation, the seat belts 695, 697 are routed through a different seat belt attachment pathway than when the seat 600 is in the rear-facing orientation and uses the seat belt lock-off system of the seat base 604.

To change the rotatable child car safety seat 600 from the level position to the recline position, the parent/caregiver can raise a portion of the seat base 604 off of the seat bottom 698 of the automobile and can rotate the rotatable recline foot 702 in the direction M until the outer side wall 712 is adjacent the rear-facing end 622 of the seat base 604. The additional height of the outer side wall 712 along the rear-facing end 622 of the seat base 604 raises the rear-facing end 622 with respect to the front-facing end 620 and tilts the seat shell 602 back towards the seat back 699 of the automobile. To change the rotatable child car safety seat 600 from the recline position to the level position, the parent/caregiver can raise a portion of the seat base 604 off of the seat bottom 698 of the automobile and can rotate the rotatable recline foot 702 in a direction opposite M until the outer side wall 712 is adjacent the front-facing end 620 of the seat base 604. A portion of the rotatable recline foot 702 can enter the cavity 704 along the bottom surface 618 of the seat base 604, which can prevent the additional height of the outer side wall 712 from raising the front-facing end 620 with respect to the rear-facing end 622.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

In Example 1 of the disclosure, there may be a child car safety seat. In Example 2 of the disclosure, the child car safety seat of Example 1 can optionally include a seat base that can include a first seat belt attachment pathway configured to receive at least a portion of an automobile seat belt when the child car safety seat is in a first configuration. In Example 3 of the disclosure, the child car safety seat of any one of Examples 1-2 can optionally include a seat shell rotatable with respect to the seat base. In Example 4 of the disclosure, the child car safety seat of any one of Examples 1-3 can optionally include a seat shell that includes a second seat belt attachment pathway configured to receive at least a portion of the automobile seat belt when the child car safety seat is in a second configuration different from the first configuration. In Example 5 of the disclosure, the child car safety seat of any one of Examples 1-4 can optionally include a seat base with a first seat belt attachment pathway that includes a seat belt lock-off system. In Example 6 of the disclosure, the child car safety seat of any one of Examples 1-5 can optionally include a seat belt lock-off system that includes a lock-off latch arm pivotably coupled to the seat base and rotatable from a locked position to an unlocked position, and a latch arm receiving cavity configured to receive a portion of the latch arm and the automobile seat belt therein. In Example 7 of the disclosure, the child car safety seat of any one of Examples 1-6 can optionally include a seat base that includes a rear-facing end configured to be positioned adjacent an automobile seat back in the first configuration; a front-facing end configured to be positioned adjacent a front end of an automobile seat bottom in the first configuration; a longitudinal axis extending from the rear-facing end to the front-facing end and comprising a center of the longitudinal axis for the seat base; and a rotation axle extending vertically from a top surface of the seat base and defining a rotation axis for the seat shell, wherein the rotation axle is offset from the center of the longitudinal axis towards the front-facing end of the seat base. In Example 8 of the disclosure, the child car safety seat of any one of Examples 1-7 can optionally include the rotation axle being disposed adjacent the front-facing end of the seat base. In Example 9 of the disclosure, the child car safety seat of any one of Examples 1-8 can optionally include the seat shell having a seat back; a seat bottom; and an axle aperture configured to receive at least a portion of a rotation axle therein. In Example 10 of the disclosure, the child car safety seat of any one of Examples 1-9 can optionally include the axle aperture being disposed along a bottom side of the seat back of the seat shell. In Example 11 of the disclosure, the child car safety seat of any one of Examples 1-10 can optionally include the seat shell including a seat rotation slot disposed along the bottom side of the seat back of the seat shell adjacent an axle aperture; and the seat base including a rotation stop tab extending vertically from the top surface of the seat base, wherein at least a portion of the rotation stop tab is insertable into the seat rotation slot to limit rotation of the seat shell with respect to the seat base. In Example 12 of the disclosure, the child car safety seat of any one of Examples 1-11 can optionally include the seat base including a recline foot member pivotably coupled to and disposed below the seat base, wherein the recline foot member is rotatable with respect to the seat base from a level position to a recline position. In Example 13 of the disclosure, the child car safety seat of any one of Examples 1-12 can optionally include a recline foot member that includes an inner side wall having a first height; an outer side wall having a second height; a first bottom surface along a first side of the recline foot member, the first bottom surface extending from the inner side wall to the outer side wall; a second bottom surface along a second side of the recline foot member opposite the first side, the second bottom surface extending from the inner side wall to the outer side wall; wherein the second height is greater than the first height and wherein the first bottom surface is configured to contact an automobile seat bottom in the level position and the second bottom surface is configured to contact the automobile seat bottom in the recline position. In Example 14 of the disclosure, the child car safety seat of any one of Examples 1-13 can optionally include the second bottom surface of the recline foot member being disposed at an acute angle to the first bottom surface of the recline foot member. In Example 15 of the disclosure, the child car safety seat of any one of Examples 1-14 can optionally include a seat base that includes a rear-facing end configured to be positioned adjacent an automobile seat back in the first configuration; a front-facing end configured to be positioned adjacent a front end of an automobile seat bottom in the first configuration; a longitudinal axis extending from the rear-facing end to the front-facing end and comprising a center of the longitudinal axis for the seat base; and a rotation axis defining an axis of rotation of the seat shell with respect to the seat base, wherein the rotation axis is offset from the center of the longitudinal axis towards the front-facing end of the seat base.

In Example 16 of the disclosure, there may be a child car safety seat. In Example 17 of the disclosure, the child car safety seat of Example 16 can optionally include a seat base and a seat shell rotatably with respect to the seat base from a use position to a load/unload position about a rotation axis. In Example 18 of the disclosure, the child car safety seat of any one of Examples 16-17 can optionally include a seat base with a rear-facing end configured to be positioned adjacent an automobile seat back in a rear-facing configuration; a front-facing end configured to be positioned adjacent a front end of an automobile seat bottom in the rear-facing configuration; a longitudinal axis extending from the rear-facing end to the front-facing end and comprising a center of the longitudinal axis for the seat base; and a rotation axis defining an axis of rotation of the seat shell with respect to the seat base, wherein the rotation axis is offset from the center of the longitudinal axis towards the front-facing end of the seat base. In Example 19 of the disclosure, the child car safety seat of any one of Examples 16-18 can optionally include a seat shell that includes a seat back; and a seat bottom; wherein the rotation axis is offset along the seat shell towards the seat back of the seat shell. In Example 20 of the disclosure, the child car safety seat of any one of Examples 16-19 can optionally include a seat base that includes a seat belt lock-off system. In Example 21 of the disclosure, the child car safety seat of any one of Examples 16-20 can optionally include a seat belt lock-off system that includes a lock-off latch arm pivotably coupled to the seat base and rotatable from a locked position to an unlocked position; and a latch arm receiving cavity configured to receive a portion of the latch arm and the automobile seat belt therein; wherein the seat belt lock-off system can be disposed adjacent the rear-facing end of the seat base, wherein the lock-off latch arm may not be accessible from a top side of the seat base when the seat shell is in the use position, and wherein the lock-off latch arm may be accessible from the top side of the seat base when the seat shell is rotated to the load/unload position about the rotation axis. In Example 22 of the disclosure, the child car safety seat of any one of Examples 16-21 can optionally include a seat base that includes: a first lateral side extending from the front-facing end to the rear-facing end; a second lateral side extending from the front-facing end to the rear facing end; wherein one of the first lateral side and the second lateral side can be configured to be disposed on an automobile seat bottom adjacent an edge of the automobile seat bottom, wherein a front end of the seat bottom extends beyond the edge of the automobile seat bottom when the seat shell is in the load/unload position. In Example 23 of the disclosure, the child car safety seat of any one of Examples 16-22 can optionally include a seat base that includes a rotation axle extending vertically from a top surface of the seat base and defining the rotation axis for the seat shell, wherein the rotation axle can be offset from the center of the longitudinal axis towards the front-facing end of the seat base, and wherein the seat shell can include an axle aperture configured to receive at least a portion of the rotation axle therein, wherein the axle aperture can be disposed along a bottom side of the seat back of the seat shell. In Example 24 of the disclosure, the child car safety seat of any one of Examples 16-23 can optionally include a seat shell that includes a rotation axle extending vertically down from a bottom side of the seat shell and defining the rotation axis for the seat shell and wherein the seat base can include an axle aperture configured to receive at least a portion of the rotation axle therein, wherein the axle aperture is offset from the center of the longitudinal axis towards the front-facing end of the seat base. In Example 25 of the disclosure, the child car safety seat of any one of Examples 16-24 can optionally include a recline foot member pivotably coupled to and disposed below the seat base. In Example 26 of the disclosure, the child car safety seat of any one of Examples 16-25 can optionally include a recline foot member that includes an inner side wall; an outer side wall; a first bottom surface along a first side of the recline foot member; and a second bottom surface along a second side of the recline foot member opposite the first side; wherein the recline foot member is rotatable with respect to the seat base from a level position, wherein the first bottom surface is configured to contact an automobile seat bottom, to a recline position, wherein the second bottom surface is configured to contact the automobile seat bottom.

In Example 27 of the disclosure, there may be a child car safety seat. In Example 28 of the disclosure, the child car safety seat of Example 27 can optionally include a seat base and a seat shell rotatable with respect to the seat base. In Example 29 of the disclosure, the child car safety seat of any one of Examples 27-28 can optionally include a seat base including a top end; an opposing bottom end; and a recline foot member pivotably coupled to and disposed along the bottom end of the seat base. In Example 30 of the disclosure, the child car safety seat of any one of Examples 27-29 can optionally include a recline foot member that includes an inner side wall having a first height; an outer side wall having a second height; a first bottom surface along a first side of the recline foot member, the first bottom surface extending from the inner side wall to the outer side wall; a second bottom surface along a second side of the recline foot member opposite the first side, the second bottom surface extending from the inner side wall to the outer side wall. In Example 31 of the disclosure, the child car safety seat of any one of Examples 27-30 can optionally include a seat shell that includes a seat back; and a seat bottom; wherein a recline foot member can be rotatable with respect to the seat base from a first position, wherein the first bottom surface is configured to contact an automobile seat bottom, to a second position, wherein the second bottom surface is configured to contact the automobile seat bottom. In Example 32 of the disclosure, the child car safety seat of any one of Examples 27-31 can optionally include a recline foot rotatable from a first position to a second position, such that, in the second position, a front end of the seat bottom is raised in a vertical direction with respect to the automobile seat bottom.

Although child safety seat features, functions, components, and parts have been described herein in accordance with the teachings of the present disclosure, the scope of coverage of this patent is not limited thereto. On the contrary, this patent covers all embodiments of the teachings of the disclosure that fairly fall within the scope of permissible equivalents.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A child car safety seat comprising:
   a seat base comprising;
      a first seat belt attachment pathway configured to receive at least a portion of an automobile seat belt when the child car safety seat is in a rearward-facing configuration;
      a first end configured to be positioned adjacent an automobile seat back in the rearward-facing configuration:
      a second end configured to be positioned adjacent a front end of an automobile seat bottom in the rearward-facing configuration; and
      a longitudinal axis extending from the first end to the second end and comprising a center of the longitudinal axis for the seat base;
   a seat shell rotatable with respect to the seat base about a vertical rotation axis, the seat shell comprising:
      a second seat belt attachment pathway provided along a back side of a seat back of the seat shell and configured to receive at least a portion of the automobile seat belt when the child car safety seat is in a forward-facing configuration;
   wherein the vertical rotation axis is offset from the center of the longitudinal axis towards the second end of the seat base.

2. The child car safety seat of claim 1, wherein the first seat belt attachment pathway comprises a seat belt lock-off system.

3. The child car safety seat of claim 2, wherein the seat belt lock-off system comprises:
   a lock-off latch arm pivotably coupled to the seat base and rotatable from a locked position to an unlocked position;
   a latch arm receiving cavity configured to receive a portion of the latch arm and the automobile seat belt therein.

4. The child car safety seat of claim 1, wherein the seat base further comprises:
   a rotation axle extending vertically from a top surface of the seat base and defining the vertical rotation axis for the seat shell, wherein the rotation axle is offset from the center of the longitudinal axis towards the second end of the seat base.

5. The child car safety seat of claim 4, wherein the rotation axle is disposed adjacent the second end of the seat base.

6. The child car safety seat of claim 4, wherein the seat shell further comprises:
   a seat back;
   a seat bottom; and
   an axle aperture configured to receive at least a portion of the rotation axle therein.

7. The child car safety seat of claim 6, wherein the axle aperture is disposed along a bottom side of the seat back of the seat shell.

8. The child car safety seat of claim 6,
wherein the seat shell further comprises a seat rotation slot disposed along the bottom side of the seat back of the seat shell adjacent the axle aperture;
wherein the seat base further comprises a rotation stop tab extending vertically from the top surface of the seat base, wherein at least a portion of the rotation stop tab is insertable into the seat rotation slot to limit rotation of the seat shell with respect to the seat base.

9. The child car safety seat of claim 1, wherein the seat base further comprises:
a recline foot member pivotably coupled to and disposed below the seat base, wherein the recline foot member is rotatable with respect to the seat base from a level position to a recline position.

10. The child car seat of claim 9, wherein the recline foot member comprises:
an inner side wall having a first height;
an outer side wall having a second height;
a first bottom surface along a first side of the recline foot member, the first bottom surface extending from the inner side wall to the outer side wall;
a second bottom surface along a second side of the recline foot member opposite the first side, the second bottom surface extending from the inner side wall to the outer side wall;
wherein the second height is greater than the first height and wherein the first bottom surface is configured to contact an automobile seat bottom in the level position and the second bottom surface is configured to contact the automobile seat bottom in the recline position.

11. The child car seat of claim 10, wherein the second bottom surface is disposed at an acute angle to the first bottom surface.

12. A child car safety seat comprising:
a seat base comprising:
a top end;
an opposing bottom end; and
a recline foot member pivotably coupled to and disposed along the bottom end of the seat base, the recline foot member comprising:
an inner side wall having a first height;
an outer side wall having a second height;
a first bottom surface along a first side of the recline foot member, the first bottom surface extending from the inner side wall to the outer side wall;
a second bottom surface along a second side of the recline foot member opposite the first side, the second bottom surface extending from the inner side wall to the outer side wall;
a seat shell rotatable with respect to the seat base and comprising:
a seat back; and
a seat bottom;
wherein the recline foot member is rotatable with respect to the seat base from a first position, wherein the first bottom surface is configured to contact an automobile seat bottom, to a second position, wherein the second bottom surface is configured to contact the automobile seat bottom.

13. The child safety seat of claim 12, wherein, in the second position, a front end of the seat bottom is raised in a vertical direction with respect to the automobile seat bottom.

14. A child car safety seat comprising:
a seat base comprising:
a rear-facing end configured to be positioned adjacent an automobile seat back in a rear-facing configuration
a front-facing end configured to be positioned adjacent a front end of an automobile seat bottom in the rear-facing configuration;
a longitudinal axis extending from the rear-facing end to the front-facing end and comprising a center of the longitudinal axis for the seat base; and
a rotation axis defining a vertical axis of rotation of a seat shell with respect to the seat base, wherein the rotation axis is offset from the center of the longitudinal axis towards the front-facing end of the seat base;
the seat shell rotatable with respect to the seat base from a use position to a load/unload position about the rotation axis, the seat shell comprising:
a seat back; and
a seat bottom.

15. The child safety seat of claim 14, wherein the seat base further comprises:
a first lateral side extending from the front-facing end to the rear-facing end;
a second lateral side extending from the front-facing end to the rear facing end;
wherein one of the first lateral side and the second lateral side are configured to be disposed on an automobile seat bottom adjacent an edge of the automobile seat bottom, wherein a front end of the seat bottom is configured to extend beyond the edge of the automobile seat bottom when the seat shell is in the load/unload position.

16. The child safety seat of claim 14, wherein the seat base comprises a rotation axle extending vertically from a top surface of the seat base and defining the rotation axis for the seat shell, wherein the rotation axle is offset from the center of the longitudinal axis towards the front-facing end of the seat base and wherein the seat shell comprises an axle aperture configured to receive at least a portion of the rotation axle therein, wherein the axle aperture is disposed along a bottom side of the seat back of the seat shell.

17. The child safety seat of claim 14, wherein the seat shell comprises a rotation axle extending vertically down from a bottom side of the seat shell and defining the rotation axis for the seat shell and wherein the seat base comprises an axle aperture configured to receive at least a portion of the rotation axle therein, wherein the axle aperture is offset from the center of the longitudinal axis towards the front-facing end of the seat base.

18. The child safety seat of claim 14, further comprising a recline foot member pivotably coupled to and disposed below the seat base and comprising:
an inner side wall;
an outer side wall;
a first bottom surface along a first side of the recline foot member; and
a second bottom surface along a second side of the recline foot member opposite the first side;
wherein the recline foot member is rotatable with respect to the seat base from a level position, wherein the first bottom surface is configured to contact an automobile seat bottom, to a recline position, wherein the second bottom surface is configured to contact the automobile seat bottom.

19. The child safety seat of claim 14, wherein the seat base further comprises:
a seat belt lock-off system comprising:

a lock-off latch arm pivotably coupled to the seat base and rotatable from a locked position to an unlocked position; and a latch arm receiving cavity configured to receive a portion of the latch arm and the automobile seat belt therein;

wherein the seat belt lock-off system is disposed adjacent the rear-facing end of the seat base, wherein the lock-off latch arm is not accessible from a top side of the seat base when the seat shell is in the use position, and wherein the lock-off latch arm is accessible from the top side of the seat base when the seat shell is rotated to the load/unload position about the rotation axis.

\* \* \* \* \*